United States Patent
Oki et al.

(10) Patent No.: US 7,535,134 B2
(45) Date of Patent: May 19, 2009

(54) SPINDLE MOTOR, AND RECORDING AND REPRODUCING APPARATUS EQUIPPED WITH THE SAME

(75) Inventors: Yoichi Oki, Ehime (JP); Masahiro Jyono, Ehime (JP); Takao Yoshitsugu, Ehime (JP)

(73) Assignee: Panasonic Corporation, Osaka (JP)

( * ) Notice: Subject to any disclaimer, the term of this patent is extended or adjusted under 35 U.S.C. 154(b) by 418 days.

(21) Appl. No.: 11/524,247

(22) Filed: Sep. 21, 2006

(65) Prior Publication Data

US 2007/0090716 A1  Apr. 26, 2007

(30) Foreign Application Priority Data

Oct. 25, 2005  (JP) .............................. 2005-309550

(51) Int. Cl.
- *H02K 1/14* (2006.01)
- *H02K 1/16* (2006.01)
- *G11B 23/03* (2006.01)
- *G11B 19/20* (2006.01)

(52) U.S. Cl. ...................... 310/67 R; 310/216; 310/217; 310/218; 310/254; 360/99.04; 360/99.07; 360/99.08

(58) Field of Classification Search ............... 310/67 R, 310/216–218, 254; 360/98.07, 99.04–99.08, 360/99.12
See application file for complete search history.

(56) References Cited

U.S. PATENT DOCUMENTS

| | | | | |
|---|---|---|---|---|
| 3,633,056 A | * | 1/1972 | Hoffmeyer | .................. 310/180 |
| 5,432,644 A | * | 7/1995 | Tajima et al. | ............ 360/99.04 |
| 5,453,972 A | * | 9/1995 | Kanazawa et al. | .......... 720/659 |
| 6,265,800 B1 | * | 7/2001 | Kimura et al. | ............... 310/152 |

FOREIGN PATENT DOCUMENTS

| | | | |
|---|---|---|---|
| JP | 5-189932 | | 7/1993 |
| JP | 9-163681 | | 6/1997 |
| JP | 2001-76417 | | 3/2001 |
| JP | 2003125568 A | * | 4/2003 |

* cited by examiner

*Primary Examiner*—Tran N Nguyen
(74) *Attorney, Agent, or Firm*—Wenderoth, Lind & Ponack, L.L.P.

(57) ABSTRACT

With a spindle motor 20, a stator core 8 comprises a plurality of salient pole components 51 that are formed in a radial shape, are wound with a stator coil 9, and are disposed at a uniform angle except for a non-equiangular pitch portion, an circular outer peripheral yoke 52 formed so as to be continuous with the outer peripheral side of the salient pole components 51, a cut-out 55 which is formed by cutting out part of the outer peripheral yoke 52 in an approximate sector-shape except in the non-equiangular pitch portion of the salient pole components 51, and a compensating pole plate 11 which is provided in the cut-out 55 along the ends on the inner peripheral side of the non-equiangular pitch portion where the salient pole components 51 are formed.

15 Claims, 19 Drawing Sheets

SPINDLE MOTOR, AND RECORDING AND
REPRODUCING APPARATUS EQUIPPED
WITH THE SAME

TECHNICAL FIELD

The present invention relates to a spindle motor that is installed in a hard disk device, an opto-magnetic disk device, an optical disk device, a floppy (trademark) [sic] disk [device], or the like, and to a recording and reproducing apparatus equipped with this spindle motor.

BACKGROUND ART

As equipment that makes use of hard disk devices, opto-magnetic disk devices, optical disk devices, floppy disk devices, and so forth has become smaller and lighter in recent years, there has been an accompanying need for making these devices smaller, thinner, larger in capacity, less costly, and so forth.

For instance, Patent Document 1 (Japanese Laid-Open Patent Application H5-189932 (laid open on Jul. 30, 1993)) discloses a disk device constituted such that the outer periphery of the stator of a spindle motor for driving a disk is surrounded with an iron core, the distance of the outside diameter of the stator from the rotor center is varied with the angle, and the outside diameter in one direction is made smaller than the diameter of the innermost periphery of the disk recording portion.

This allows the head drive actuator to be disposed next to the stator in this one direction, so the head drive actuator can be disposed closer to the center of the disk than in the past, affording a disk drive device that is thinner and more compact.

DISCLOSURE OF THE INVENTION (Problems Which the Invention is Intended to Solve)

The following problems were encountered with the above-mentioned conventional disk device, however.

With the spindle motors disclosed in the above publications, when a plurality of heads were installed, for example, there had to be enough room for the plurality of heads to operate in the height direction, so the device could not be made as thin and compact as needed.

It is an object of the present invention to provide a spindle motor with which a device can be made sufficiently thin and compact to meet requirements, even when installed in a hard disk device or the like equipped with a plurality of heads, and to provide a recording and reproducing apparatus equipped with this spindle motor.

(Means Used to Solve the Above-Mentioned Problems)

The spindle motor pertaining to the first invention comprises a plurality of salient pole components, a circular base, a cut-out, and a compensating pole plate. A stator coil is wound around each of the plurality of salient pole components, and these components are disposed at an equiangular pitch, except for a non-equiangular pitch portion. The circular base is formed so as to be substantially continuous with the ends of the plurality of salient pole components, and at least part of the portion linking the salient pole components in the non-equiangular pitch portion is cut out in the axial direction or the peripheral direction whose center is the shaft. The compensating pole plate is disposed in the vicinity of the ends of the salient pole components in the non-equiangular pitch portion, and includes a magnetic body.

Here, in a spindle motor comprising a circular base disposed with the rotational axis as its center, and a plurality of salient pole components substantially linked on the inner or outer peripheral side of the circular base, at least part of the portion of the circular base linking the salient pole components disposed at the ends of the non-equiangular pitch portion forms a cut-out in the peripheral direction of the axial direction. A compensating pole plate that includes a magnetic body is provided in the vicinity of the ends on the inner or outer peripheral side of the salient pole components in this cut-out portion.

When it is said that the plurality of salient pole components and the circular base are substantially linked at the ends on the inner or outer peripheral side of the circular base, this means that a core in which the salient pole components and the circular base are integrally formed, and a split core in which the salient pole components and the circular base are formed separately and then mated together, are both encompassed.

Usually, if the stator (the circular base and salient pole components) becomes asymmetric as a result of thus providing a cut-out at one portion, there is the danger that there will be so much imbalance in the rotational torque that smooth rotation becomes impossible.

With the spindle motor of the present invention, a compensating pole plate that includes a magnetic body is provided to the portion that is asymmetric as a result of a portion in which the salient pole components are disposed unevenly (the non-equiangular pitch portion) being provided, and a cut-out being formed in the circular base corresponding to this portion.

The result of this is that it eliminates the torque imbalance otherwise caused by providing the cut-out, and this allows the disk to rotate smoothly.

Also, since this compensating pole plate is disposed at a location in the vicinity of the ends on the inner or outer peripheral side of the adjacent salient pole components, neither the salient pole components nor the circular base is present on the inner or outer peripheral side of the compensating pole plate.

This ensures enough room for the cut-out, particularly in the up and down direction. Accordingly, if a read that reads information from a recording medium is disposed at a low position in the space of this cut-out, and if we assume, for example, that the thickness of a hard disk device of one head mounted with a conventional 0.85-inch disk is approximately 3.3 mm, then the hard disk device can be up to 3.3 mm thick, as opposed to the 5.0 thickness in the past, even with two heads. As a result, even a spindle motor mounted with a plurality of heads can be allow the device to be thinner and more compact.

The spindle motor pertaining to the second invention is the spindle motor pertaining to the first invention, wherein the compensating pole plate is formed so as to be continuous with respect to the circular base.

Here, the compensating pole plate is formed so as to be continuous with respect to the circular base, or in other words, so as to link to the circular base.

The result is that the compensating pole plate can be formed integrally with the circular base, which improves production efficiency and lowers cost as compared to when the compensating pole plate is formed as a separate member.

The spindle motor pertaining to the third invention is the spindle motor pertaining to the first invention, further comprising a base component on which the salient pole components and the circular base are placed, wherein the compensating pole plate is formed so as to be continuous with respect to the base component.

Here, the compensating pole plate is formed so as to be continuous with respect to the base component on which the salient pole components and the circular base are placed, or in other words, so as to be linked to the base component.

The result is that when the base plate is made of a ferrous or other metal material, the compensating pole plate can be formed from the same material as that of the base plate by cutting open some of the base plate, for instance, so the cost is lower than when the compensating pole plate is formed as a separate member from the base plate.

Also, since the compensating pole plate is formed separately from the salient pole components, the compensating pole plate does not restrict the movement of a winding nozzle when the salient pole components are wound with their stator coil. As a result, the winding of the stator coil can be accomplished more easily, and a spindle motor can be manufactured more efficiently.

The spindle motor pertaining to the fourth invention is the spindle motor pertaining to the first invention, further comprising a base component on which the salient pole components and the circular base are placed, wherein the compensating pole plate is fixed with respect to the base component.

Here, the compensating pole plate is fixed with respect to the base component on which the salient pole components and the circular base are placed. As a result, the compensating pole plate is fixed to the base plate after being formed as a separate component from the base, and this allows a compensating pole plate including a magnetic body to be formed even when the base plate is a non-magnetic body such as an aluminum-based metal material.

Also, since the compensating pole plate is formed separately from the salient pole components, the compensating pole plate does not restrict the movement of a winding nozzle when the salient pole components are wound with their stator coil. As a result, the winding of the stator coil can be accomplished more easily, and a spindle motor can be manufactured more efficiently.

The spindle motor pertaining to the fifth invention is the spindle motor pertaining to the first invention, further comprising a magnetic shield plate attached so as to cover the upper part of the salient pole components and the circular base, wherein the compensating pole plate is formed so as to be continuous with respect to the magnetic shield plate.

Here, the compensating pole plate is formed so as to be continuous with respect to the magnetic shield plate disposed at the upper part of the circular base and the salient pole components, or in other words, so as to be linked to the magnetic shield plate.

The result is that the compensating pole plate can be formed from the same material as that of the magnetic shield plate by cutting open some of the magnetic shield plate, for instance, so the cost is lower than when the compensating pole plate is formed as a separate member from the magnetic shield plate.

Also, since the compensating pole plate is formed separately from the salient pole components, the compensating pole plate does not restrict the movement of a winding nozzle when the salient pole components are wound with their stator coil. As a result, the winding of the stator coil can be accomplished more easily, and a spindle motor can be manufactured more efficiently.

The spindle motor pertaining to the sixth invention is the spindle motor pertaining to the first invention, wherein the compensating pole plate is formed independent from other magnetic body materials.

Here, the compensating pole plate including a magnetic body can be formed independently from other magnetic bodies by employing a molded motor structure, for example.

This allows the magnetic body included in the compensating pole plate to function without affecting the motor magnetic circuit included in the spindle motor. Furthermore, the winding of the stator coil is performed in a state in which there is no compensating pole plate, and the relative position of the compensating pole plate can be ensured by forming the compensating pole plate simultaneously with the stator molding, so the work is facilitated and a spindle motor with more stable characteristics can be obtained.

The spindle motor pertaining to the seventh invention is the spindle motor pertaining to the first or second invention, wherein the salient pole components, the circular base, and the compensating pole plate are formed by laminating three layers, namely, first to third layers. The first layer includes the salient pole components and the circular base in which the cut-out is formed. The second layer includes the circular base that continues in a substantially circular shape, and the salient pole components in part of which the cut-out has been formed. The third layer includes the circular base that continues in a substantially circular shape, and the compensating pole plate disposed so as to correspond to the position of the cut-out included in each of the first and second layers.

Here, the salient pole components, the circular base, and the compensating pole plate are formed by a combination of a first layer in which the circular base and the salient pole components are both partially cut out, a second layer in which the circular base remains all the way around and part of the salient pole components have been cut out, and a third layer including the compensating pole plate and the entire periphery of the circular base.

The result of this structure, in which part of the plurality of salient pole components is cut out and a second layer is included that includes the circular base whose entire periphery remains, is that adequate strength can be ensured for the circular base even when cut-outs are formed in part of the salient pole components and the circular base. Thus, this avoids a change in the pitch of the salient pole components caused by the effect of cut-outs having been formed during the winding of the stator coil, and allows a spindle motor to be provided more stably and at lower cost.

Furthermore, because the layer including the salient pole components is formed separately from the layer including the compensating pole plate, the compensating pole plate will not get in the way of the winding of the stator coil if the layers are put together after the salient pole components have been wound with their stator coil. Thus, production work is facilitated and a spindle motor can be produced more efficiently.

The spindle motor pertaining to the eighth invention is the spindle motor pertaining to the first or second invention, wherein the salient pole components, the circular base, and the compensating pole plate are formed by laminating two layers, namely, a first layer and a second layer. The first layer includes the salient pole components and the circular base in which a cut-out is formed. The second layer includes the circular base that continues in a substantially circular shape, and the compensating pole plate disposed so as to correspond to the position of the cut-out included in the first layer.

Here, the portion of the core including the circular base and the salient pole components is formed divided into a first layer, in which a cut-out is formed in the salient pole components and the circular base, and a second layer, which includes the circular base and the compensating pole plate.

This allows the use of two metal molds to form the core portion.

Furthermore, because the layer including the salient pole components and the layer including the compensating pole plate are formed separately, the compensating pole plate will not get in the way of the winding of the stator coil if the layers are put together after the salient pole components have been wound with their stator coil. Thus, production work is facilitated and a spindle motor can be produced more efficiently.

The spindle motor pertaining to the ninth invention is the spindle motor pertaining to any of the first to eighth inventions, wherein the compensating pole plate is formed in an arc shape whose center is the rotational axis in plan view.

Here, the compensating pole plate disposed in the vicinity of the ends on the inner peripheral side of the plurality of salient pole components is formed in an arc shape whose center is the rotational axis in plan view.

This effectively prevents the generated torque from being disrupted by leaking of magnetic flux from the portion where the cut-out is formed, that is, from between adjacent salient pole components on both sides of the compensating pole plate. Also, by having the compensating pole plate in an arc shape, a uniform magnetic flux can be imparted in the radial direction whose center is the rotational axis, so a disk-shaped recording medium can be rotated more smoothly.

The spindle motor pertaining to the tenth invention is the spindle motor pertaining to any of the first to ninth inventions, wherein the angle θ of the compensating pole plate that is disposed in the non-equiangular pitch portion and has the shaft as its center is set by the following relational formula (1):

$$\theta = 360/Nm \times 2 \tag{1}$$

where the magnetization number Nm of the magnet=4+2n (n=1, 3, 5, ...),
the salient pole number Np of the stator=(Nm−2)×¾, and
the stator salient pole pitch θ1=(360−θ)/Np.

Here, with a spindle motor having a basic structure comprising 4 magnetic poles and 3 salient pole components, and having a magnetization number of 6 or more magnetic poles, the cutting angle of the cut-out is set so as to satisfy the conditions of the above relational formula.

As a result, this angle can be set, for example, so that a sufficient range of motion can be ensured for the plurality of heads placed on the hard disk device, and the space of the cut-out will not be too wide.

The spindle motor pertaining to the eleventh invention is the spindle motor pertaining to the tenth invention, said spindle motor including 14 magnetic poles and 9 salient pole components, wherein the angle θ of the compensating pole plate is set to between 49 and 53 degrees.

Here, with a spindle motor comprising 14 magnetic poles and 9 poles, the angle at which the compensating pole plate is formed is set within the range given above.

This allows a spindle motor to be obtained in which torque fluctuation is kept to a minimum in a spindle motor having an asymmetrically shaped stator core.

The spindle motor pertaining to the twelfth invention is the spindle motor pertaining to any of the first to ninth inventions, wherein the angle θ of the compensating pole plate that is disposed in the non-equiangular pitch portion and has the shaft as its center is set by the following relational formula (2):

$$\theta = 360/Nm \times 2 \tag{2}$$

where the magnetization number Nm of the magnet=4+2n (n=0, 1, 2, 3, ...),
the salient pole number Np of the stator=(Nm−2)×½, and
the stator salient pole pitch θ1=(360−θ)/Np.

Here, with a spindle motor having a basic structure comprising 2 magnetic poles and 3 salient pole components, and having a magnetization number of 4 or more magnetic poles, the cutting angle of the cut-out is set so as to satisfy the conditions of the above relational formula.

As a result, this angle can be set, for example, so that a sufficient range of motion can be ensured for the plurality of heads placed on the hard disk device, and the space of the cut-out will not be too wide.

The spindle motor pertaining to the thirteenth invention is the spindle motor pertaining to the first invention, further comprising a magnetic shield plate attached so as to cover the upper part of the salient pole components and the circular base. The magnetic shield plate is bent so as to cover part of the cut-out circular base, or the non-equiangular pitch portion that is part of the salient pole components.

As a result, electromagnetism in the non-equiangular pitch portion or the cut-out can be effectively prevented from affecting the heads, disks, or the like.

The spindle motor pertaining to the fourteenth invention is the spindle motor pertaining to the fifth invention, wherein the magnetic shield plate is bent so as to cover part of the cut-out circular base, or the non-equiangular pitch portion that is part of the salient pole components.

As a result, electromagnetism in the non-equiangular pitch portion or the cut-out can be effectively prevented from affecting the heads, disks, or the like.

The recording and reproducing apparatus pertaining to the fifteenth invention is equipped with the spindle motor pertaining to any of the first to fourteenth inventions.

As a result, a spindle motor mounted with a plurality of heads can be made thinner and more compact, and this in turn allows the overall recording and reproducing apparatus in which this spindle motor is installed to be made thinner and more compact.

(Effect of the Invention)

With the spindle motor pertaining to the present invention, an apparatus can be made thinner and more compact even with a spindle motor mounted with a plurality of heads.

With the spindle motor pertaining to the second invention, production efficiency is improved and costs are reduced.

BEST MODE FOR CARRYING OUT THE INVENTION

A hard disk device (hereinafter referred to as HDD) 40 equipped with a spindle motor 20 pertaining to an embodiment of the present invention will now be described through reference to FIGS. 1 to 8.

[Overall Structure of HDD 40]

Figure 1:
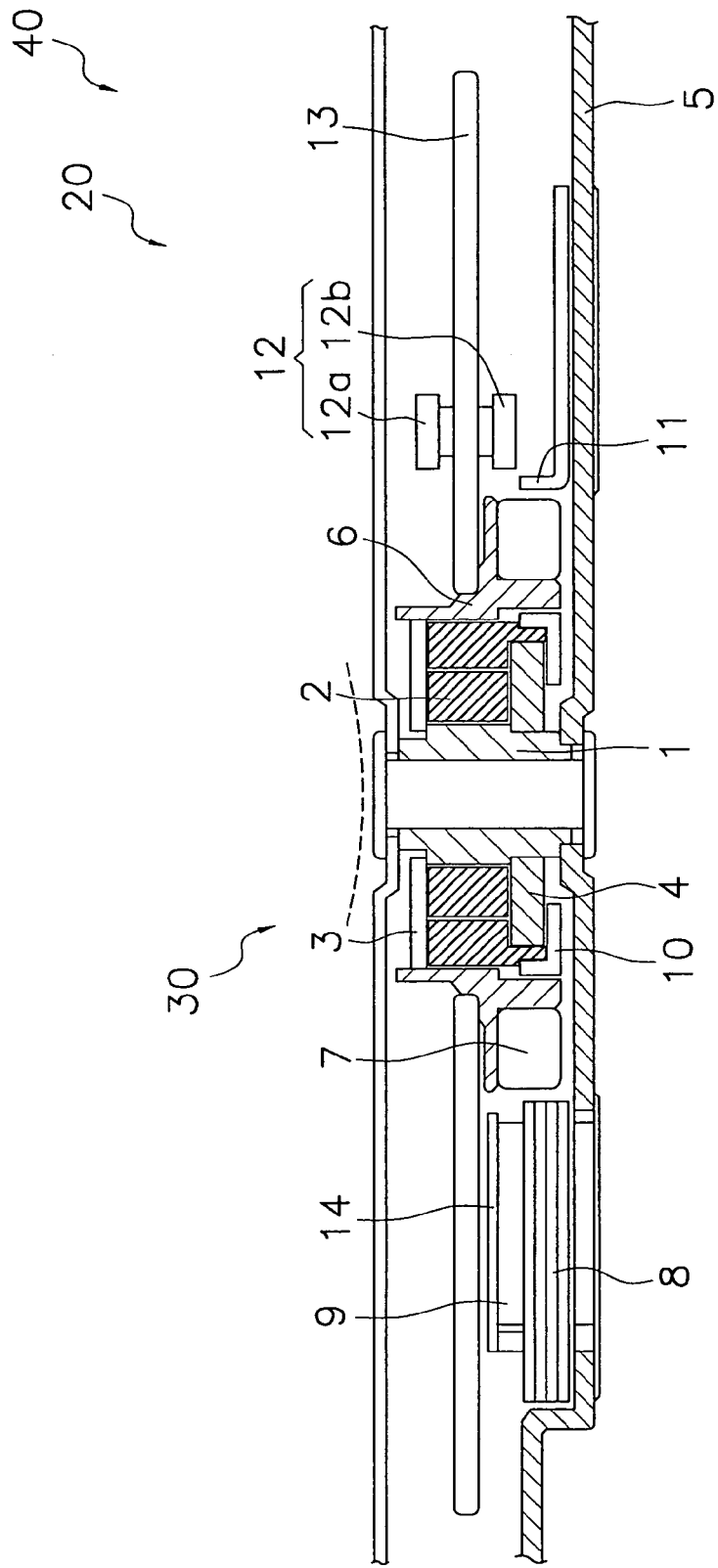
FIG. 1 is a cross-sectional view of the internal structure of a HDD mounted with the spindle motor pertaining to an embodiment of the present invention.

As shown in FIG. 1, the inside of the HDD 40 pertaining to this embodiment is equipped with the spindle motor 20 and a head component 12 including a plurality of recording and reproduction heads 12a and 12b. Information is written to a disk (recording medium) 13 by the recording and reproduction heads 12a and 12b included in the head component 12, or information that has already been written is reproduced.

The head component 12 is mounted with two recording and reproduction heads 12a and 12b, which are disposed close to the front and back sides of the disk 13.

The disk 13 is a disk-shaped recording medium that is attached to the HDD 40 and has a diameter of 0.85 inch, for example.

The spindle motor 20 is an apparatus that serves as a rotational drive source for rotationally driving the disk 13, and as shown in FIG. 1, it is equipped with a magnet 7, a stator core 8, a stator coil 9, a retainer plate 10, a compensating pole plate 11, a magnetic shield plate 14, and a bearing component 30.

[Description of the Members Constituting the Spindle Motor 20]

The magnet 7 is made up of an Nd—Fe-Bo-based resin magnet, and is mounted to a hub 6.

The stator core 8 has salient pole components 51 formed on each of sheets 22 and 23 (discussed below), and is wounded with the stator coil 9. The stator core 8 comprises a plurality of laminated silicon steel plates. The stator core 8 can also be a thin type comprising just one silicon steel plate.

The retainer plate 10 latches the outer peripheral side of a sleeve 2 included in the bearing component 30.

The compensating pole plate 11 is disposed at a location corresponding to the ends on the inner peripheral side of the salient pole components 51 in a cut-out non-equiangular pitch portion) 55 included in the stator core 8 (discussed below), and is provided to compensate for the imbalance in the magnetic flux caused by forming the cut-out 55. The structure of this compensating pole plate 11 will be discussed in detail below.

The magnetic shield plate 14 is attached so as to cover the upper part of the stator core 8, and is a magnetic stainless steel material having a thickness of 0.1 mm, for preventing leakage of the magnetic flux to the outside.

The bearing component 30 is a hydrodynamic bearing device included in the spindle motor 20, and includes a shaft 1, the sleeve 2, a seal plate 3, a thrust flange 4, a base (base component) 5, and the hub 6.

[Description of the Members Constituting the Bearing Component 30]

The shaft 1 is a member that serves as the rotational shaft of the bearing component 30, and is formed from stainless steel.

The sleeve 2 is fitted so as to be rotatable with respect to the shaft 1 and the thrust flange 4. A thrust dynamic pressure generation groove (not shown) for generating dynamic pressure is formed in the face of the thrust flange 4 across from the sleeve 2 in the axial direction, and a thrust dynamic pressure generation component is formed between the thrust flange 4 and the sleeve 2. The sleeve 2 is formed from a copper alloy such as brass, and its surface has undergone electroless nickel plating.

The seal plate 3 is attached so as to be fitted at the upper part of the sleeve 2, and prevents leakage of the lubricant that is present in the thrust dynamic pressure generation component.

The thrust flange 4 is integrally machined into, or is fixed by press-fitting or adhesive bonding to, the shaft 1, and is formed from stainless steel.

The base 5 is formed from magnetic stainless steel, and is sometimes formed by plating a ferrous material. If the size is large, it is formed from an aluminum-based metal material (a non-magnetic material), and constitutes a portion on the stationary side of the spindle motor 20. The base 5 is fixed to the housing (not shown) of the HDD 40. Also, one end of the shaft 1 of the bearing component 30 is fixed near the middle portion of the base 5.

The hub 6 is formed from stainless steel that is easy to cut and has excellent outgas resistance, and is fixed so as to mate with the outer peripheral side of the sleeve 2, and therefore rotates integrally with the sleeve 2. Also, the hub 6 supports the magnet 7 at a magnet support component formed in the outer peripheral face, and supports the disk 13 at a disk receiving component that is similarly formed on the outer peripheral side.

[Structure of the Stator Core 8]

Figure 2:
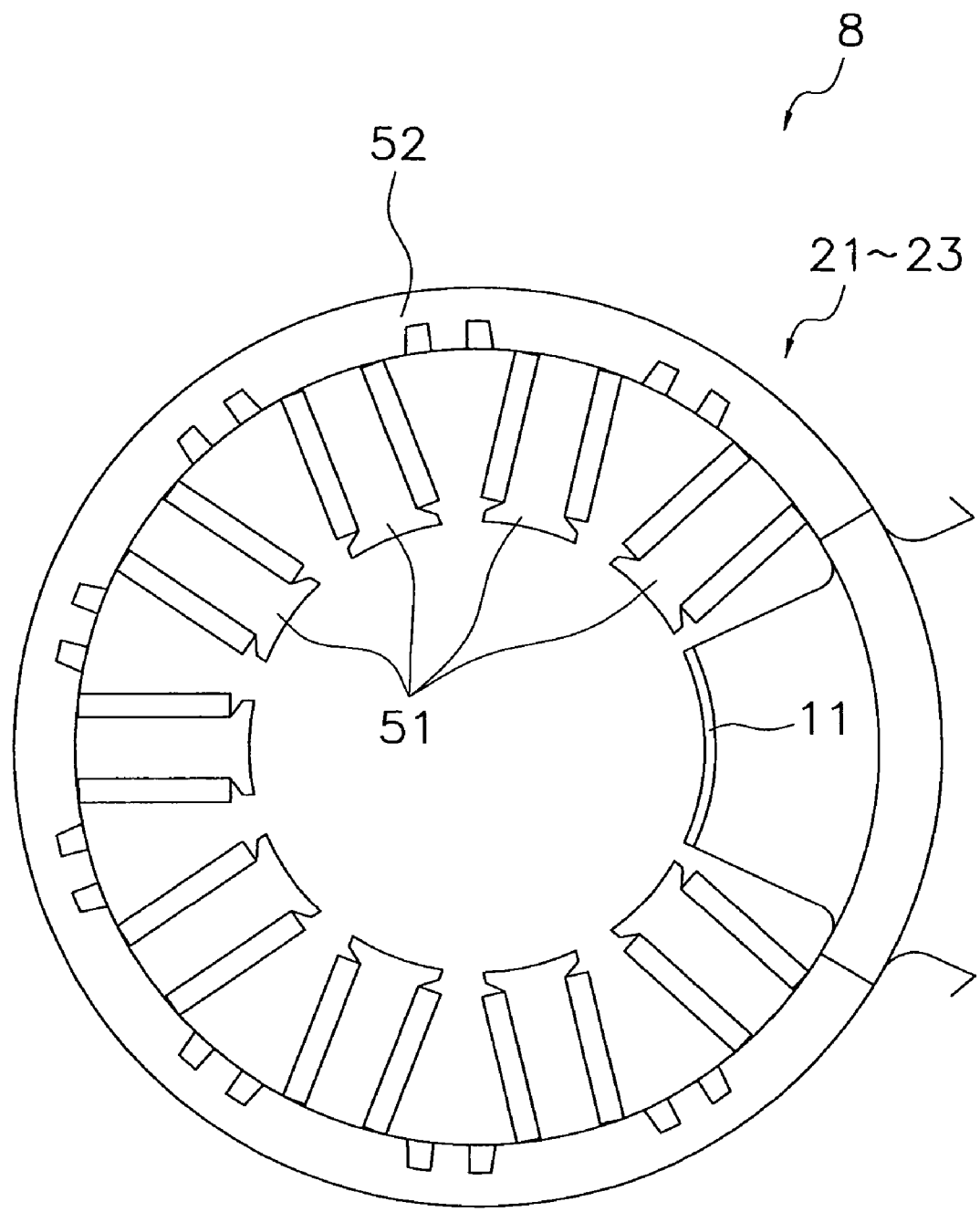
FIG. 2 is a plan view of the stator core included in the spindle motor of FIG. 1.

As shown in FIG. 2, with the spindle motor 20 pertaining to this embodiment, the stator core 8 is formed by laminating a compensating pole plate sheet (third layer) 21, a salient pole component cut-out sheet (second layer) 22, and a salient pole component and outer peripheral yoke cut-out sheet (first layer) 23.

Figure 3:
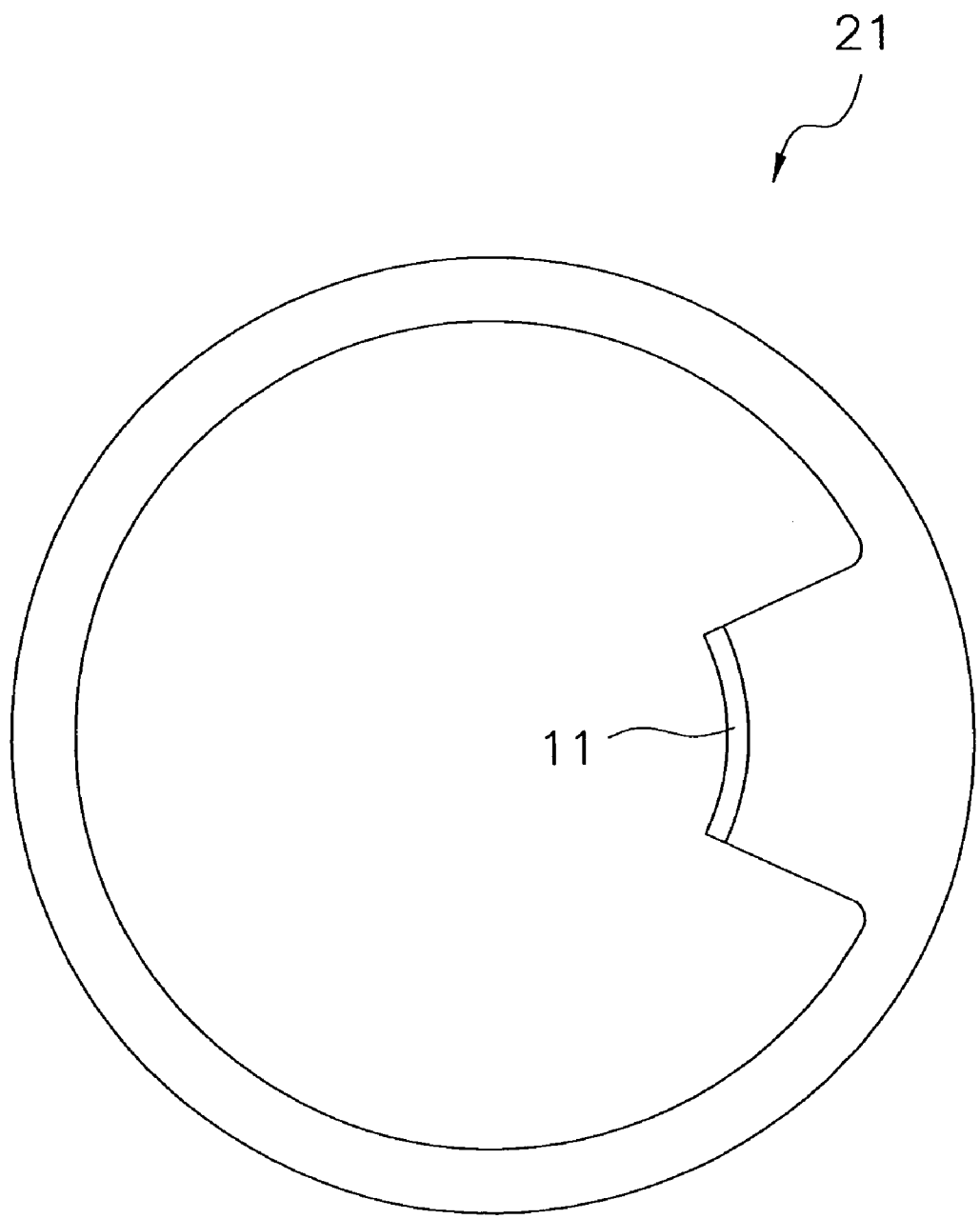
FIG. 3 is a plan view of the compensating pole plate sheet constituting the stator core of FIG. 2.

As shown in FIG. 3, the compensating pole plate sheet 21 is an circular sheet whose outer peripheral portion is substantially the same size as an outer peripheral yoke (circular base) 52. Part of the sector-shaped portion formed in a part of the sheet 21 is raised up, and the compensating pole plate 11 is formed so as to be arc-shaped in plan view, and so as to be disposed along the ends on the inner peripheral side of the plurality of salient pole components 51 formed in the other laminated sheets 22 and 23. The compensating pole plate sheet 21 is disposed as the lowermost layer in the laminated state shown in FIG. 2.

Figure 4:
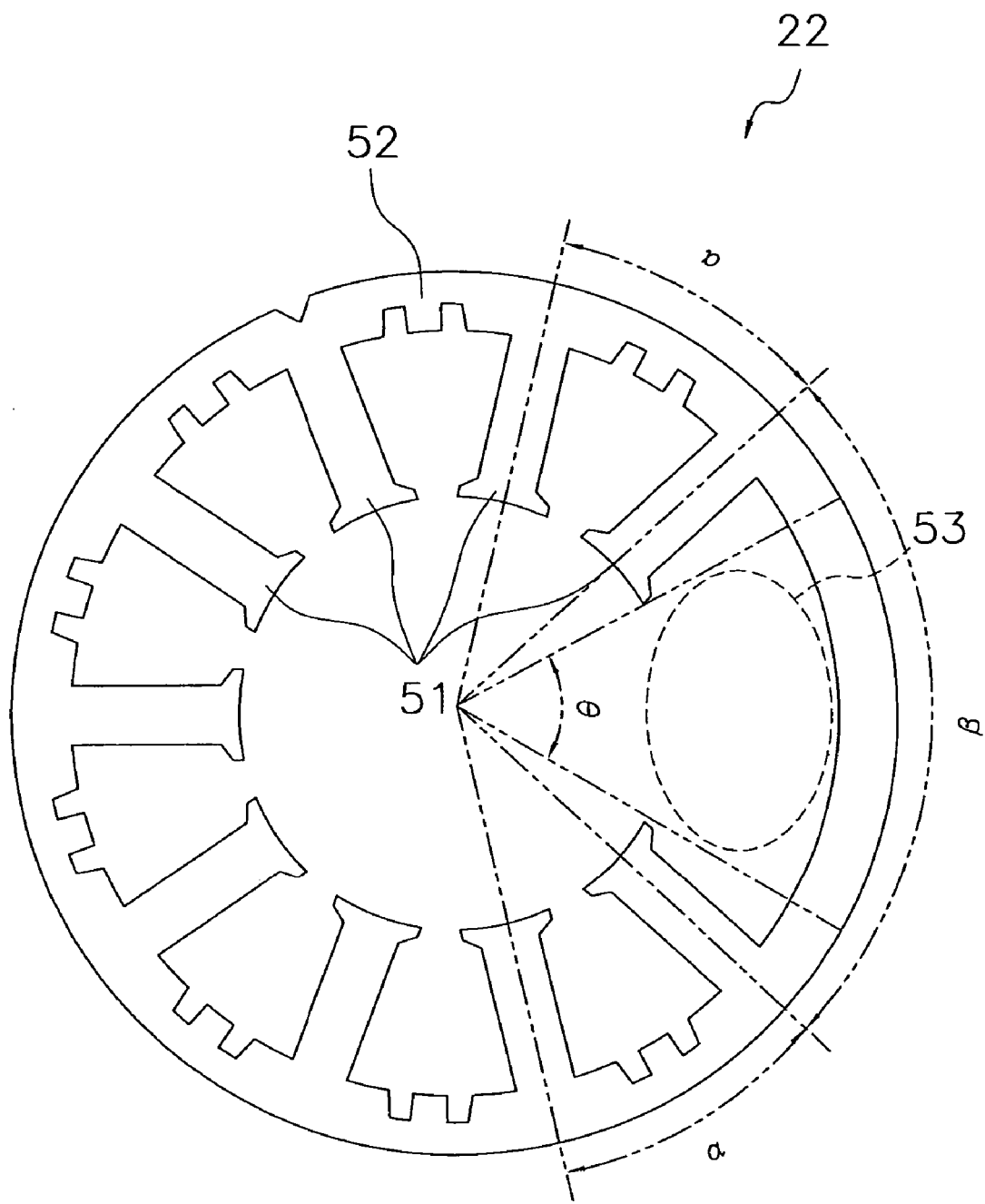
FIG. 4 is a plan view of the salient pole component cut-out sheet constituting the stator core of FIG. 2.

As shown in FIG. 4, the salient pole component cut-out sheet 22 is a circular sheet whose outer peripheral portion is substantially the same size as the outer peripheral yoke 52, and has the plurality of salient pole components 51 formed in a radial shape, and the circular outer peripheral yoke 52. The salient pole component cut-out sheet 22 is linked to the outer peripheral yoke 52 in a circular state, while part of the salient pole components 51 is cut away to form a cut-out (non-equiangular pitch portion) 53. In other words, the salient pole components 51 are disposed at a uniform angle α, except for the portion of the cut-out 53, which is a non-equiangular pitch portion disposed at a non-uniform angle β. The salient pole component cut-out sheet 22 is laminated between the salient pole component and outer peripheral yoke cut-out sheet 23 and the compensating pole plate sheet 21 in the laminated state shown in FIG. 2.

Figure 5:
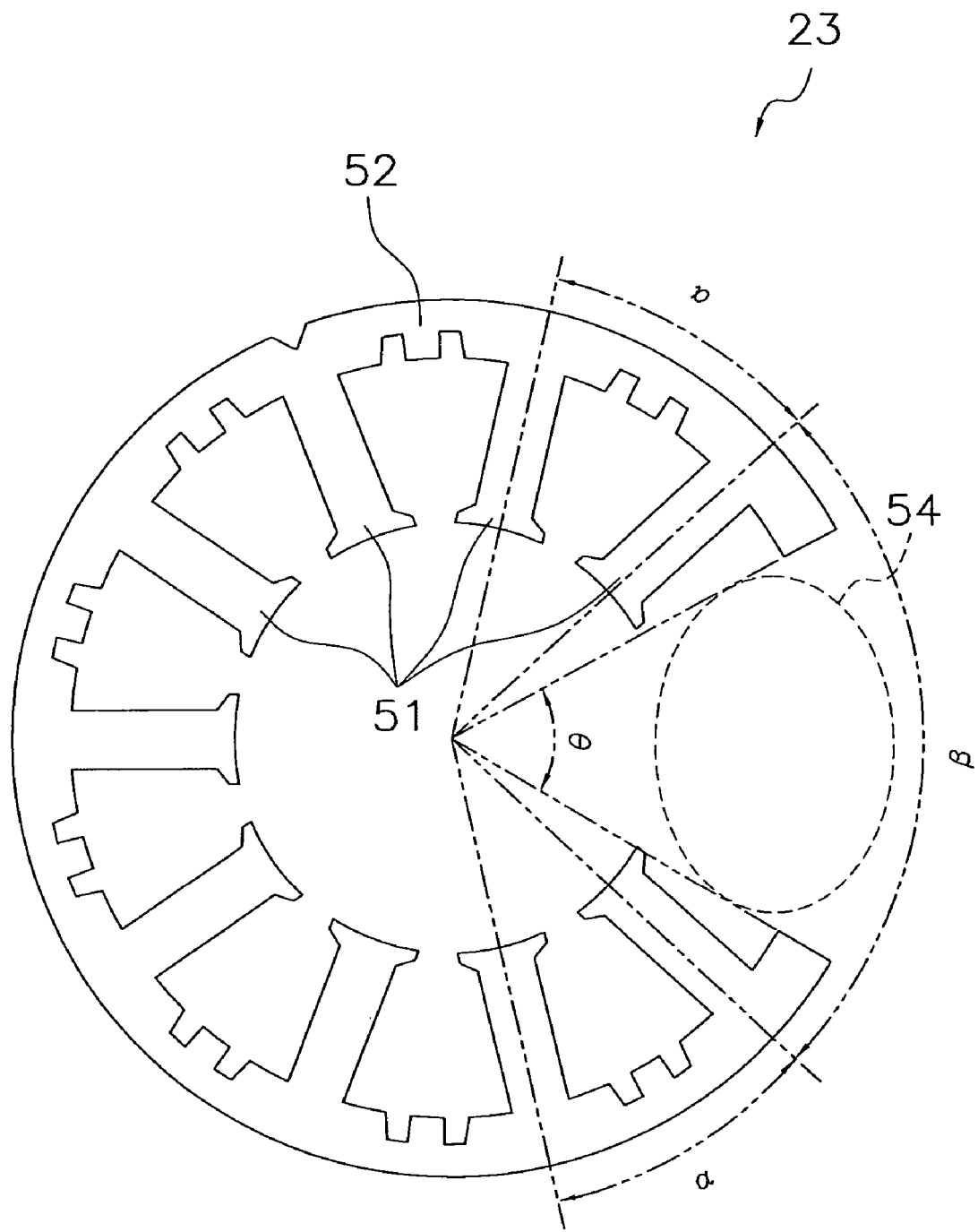
FIG. 5 is a plan view of the salient pole component and outer peripheral yoke cut-out sheet constituting the stator core of FIG. 2.

As shown in FIG. 5, the salient pole component and outer peripheral yoke cut-out sheet 23 is a circular sheet whose outer peripheral portion is substantially the same size as the outer peripheral yoke 52, and has the plurality of salient pole components 51 formed in a radial shape, and the circular outer peripheral yoke 52. The salient pole component and outer peripheral yoke cut-out sheet 23 is roughly C-shaped, with a cut-out (non-equiangular pitch portion) 54 formed at part of the salient pole components 51 and part of the circular shape. In other words, just as with the salient pole component cut-out sheet 22, the salient pole components 51 are disposed at a uniform angle α, except for the portion of the cut-out 53, which is a non-equiangular pitch portion disposed at a non-uniform angle β. The salient pole component and outer peripheral yoke cut-out sheet 23 is disposed as the uppermost layer in the laminated state shown in FIG. 2.

The procedure for obtaining the stator core 8 shown in FIG. 6 by laminating the above-mentioned sheets 21 to 23 will now be described.

First, the salient pole component cut-out sheet 22 and the salient pole component and outer peripheral yoke cut-out sheet 23 are each punched out in their respective shapes, and are laminated so that their center portions are aligned concentrically. As to the order of lamination, the salient pole component and outer peripheral yoke cut-out sheet 23 is laminated so as to be over the salient pole component cut-out sheet 22.

Next, this laminate is given an insulating coating (powder coating, spray coating, or electrodeposition coating), and the stator coil 9 is wound around the portions of the salient pole components 51. That is, the stator core 8 is formed by laminating so that the portions of the salient pole components 51 formed in the two sheets 22 and 23 are aligned, and the stator coil 9 is wound around this stator core 8. Here, since the laminate is produce so as to include the salient pole component cut-out sheet 22 whose outer peripheral portion is linked in a circular shape, a certain amount of stiffness can be ensured in the laminate even when the cut-outs 53 and 54 are formed in part of the sheets 22 and 23. Accordingly, even when the cut-outs 53 and 54 are formed, the stator core 8 can be prevented from being deformed when chucked during winding. Furthermore, even if the laminate constituted by the sheets 22 and 23 is thin, the same effect can be obtained by interposing the salient pole component cut-out sheet 22 whose outer peripheral portion is linked in a circular shape.

Figure 6:
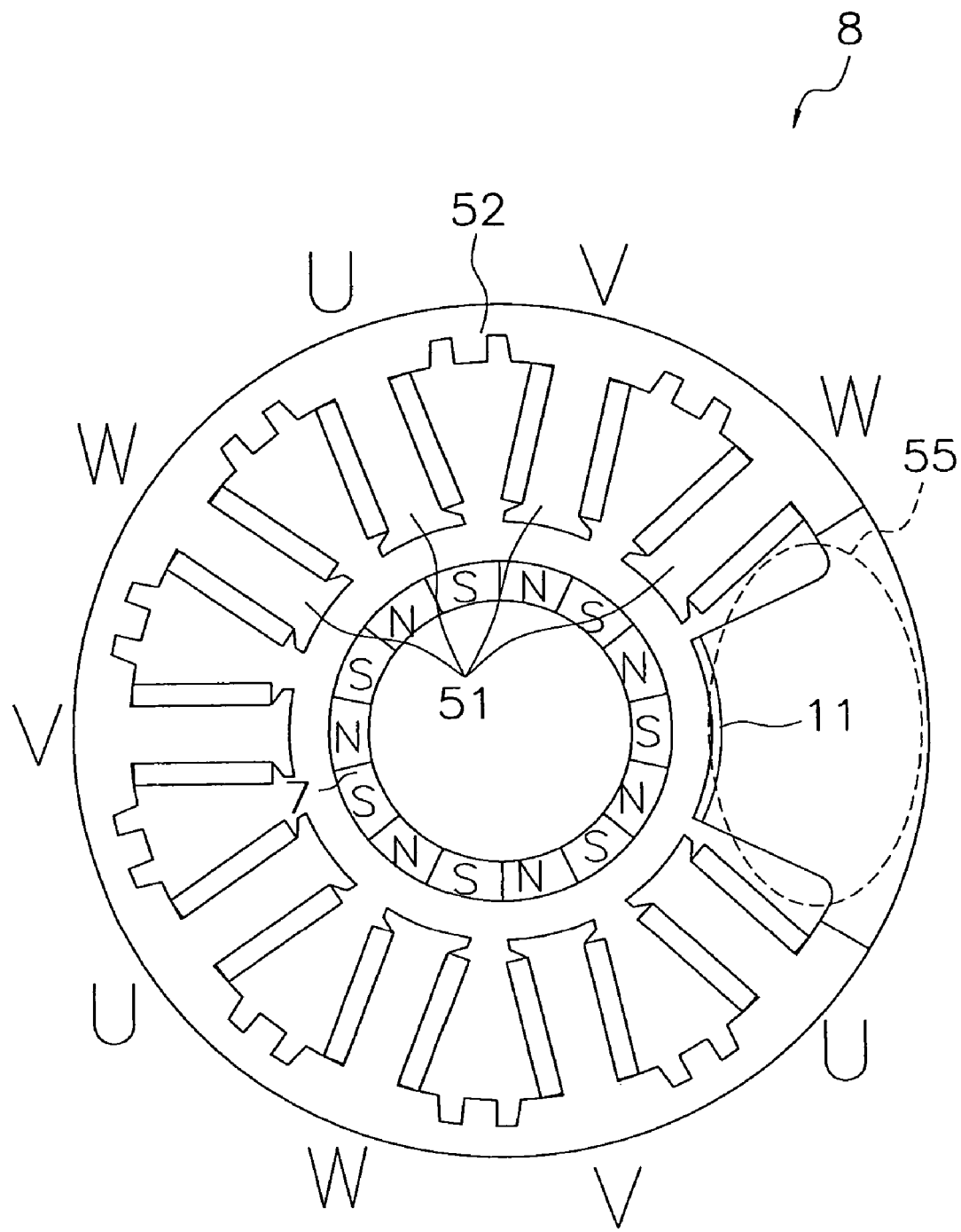
FIG. 6 is an enlarged view of the structure around the compensating pole plate, out of the entire internal structure of the HDD of FIG. 1.

After the winding, the compensating pole plate sheet 21 is fixed as the lowermost layer to the laminate made up of the sheets 22 and 23, concentrically and aligned with the center position, by adhesive bonding, welding, or the like, which forms the cut-out 55 at the specified position as shown in FIG. 6, and this produces the stator core 8 in which the compensating pole plate 11 is disposed at the position of the cut-out 55. The cut-out 55 shown in FIG. 6 is formed as the result of laminating so that the portions of the cut-outs 53 and 54 included in the sheets 22 and 23 are aligned.

By laminating the compensating pole plate sheet 21 after the stator coil 9 has been wound as discussed above, even if the gap between the compensating pole plate 11 and the adjacent salient pole components 51 (slot gap) is smaller than the spacing between the salient pole components 51 (slot spacing) in the laminated state shown in FIG. 6, the compensating pole plate 11 will still not get in the way during winding and reduce work efficiency. On the other hand, it is possible to prevent the generated torque from being disrupted by leaking of magnetic flux from the portion where the cut-out 55 is formed by disposing the components closer together so that the spacing between the compensating pole plate 11 and the salient pole components 51 adjacent to the compensating pole plate 11 (slot spacing) is smaller.

[Internal Structure of the HDD 40]

Next, the structure when the stator core 8 is assembled to the HDD 40 mounted with the spindle motor 20 will be described through reference to FIGS. 7 and 8.

Figure 7:
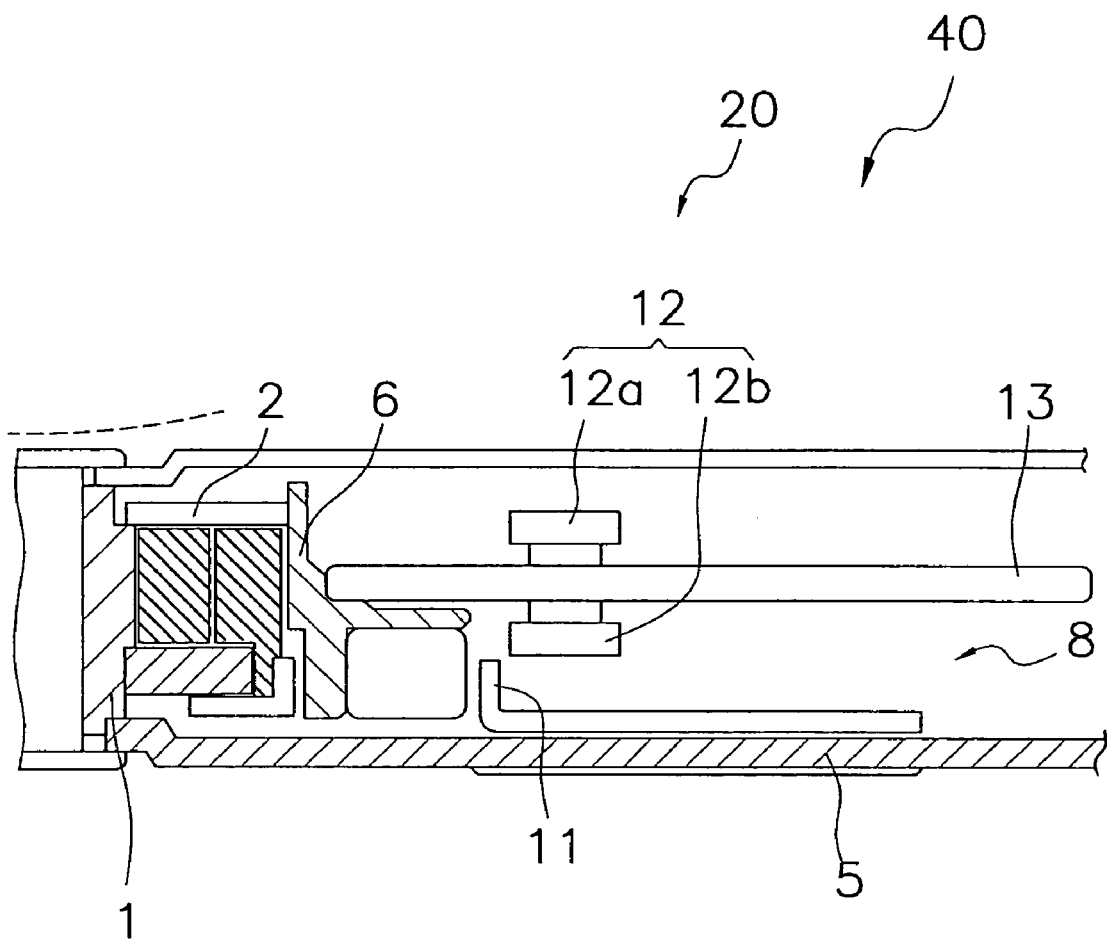
FIG. 7 is an enlarged view of the structure of the portion other than around the compensating pole plate, out of the entire internal structure of the HDD of FIG. 1.

As shown in FIG. 7, the recording and reproduction heads 12a and 12b (the head component 12) are disposed so as to be near the compensating pole plate 11 and above and below the single disk 13 of the stator core 8 at the portion corresponding to the cut-out 55 where the compensating pole plate 11 is disposed inside the HDD 40. The compensating pole plate 11 is formed by stamping part of the compensating pole plate sheet 21 (see FIG. 3) and leaving a portion that protrudes to the inner peripheral side, and raising this portion substantially vertically in an L-shape.

Here, since the cut-out 55 in which the compensating pole plate 11 is disposed is a region in which no salient pole components 51 are formed as discussed above, a space in which the recording and reproduction heads 12a and 12b can move is formed between the base 5 and the disk 13. As a result, thee is no need to increase the thickness by an amount corresponding to a plurality of recording and reproduction heads 12a and 12b even when a plurality of recording and reproduction heads 12a and 12b are mounted on the HDD 40. Thus, even when a plurality of recording and reproduction heads 12a and 12b are mounted on the HDD 40, the thickness can be kept to about the same as that of a HDD in which just one recording and reproduction head has been mounted.

Figure 8:
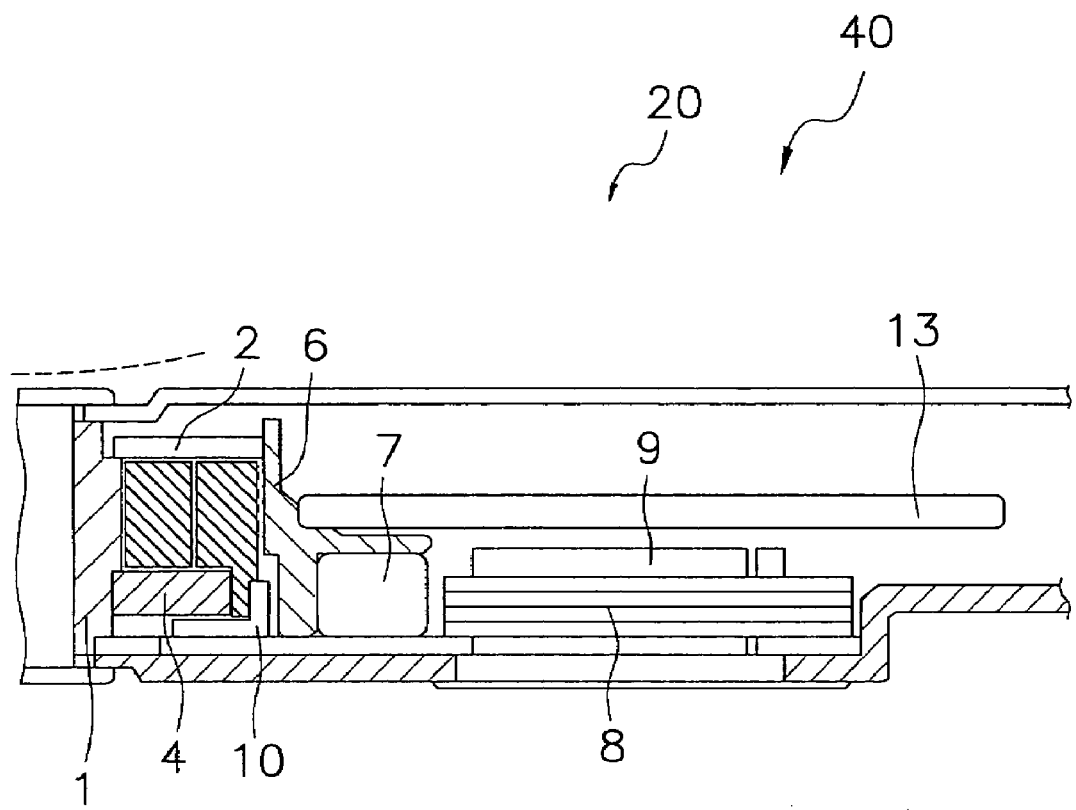
FIG. 8 is a plan view of the positional relationship between the magnet and the cut-out in the stator core of FIG. 2.

As shown in FIG. 8, the stator core 8 is wound with the stator coil 9 except for the portion corresponding to the cut-out 55 inside the HDD 40, and [this] is disposed across from the magnet 7 supported on the outer peripheral side of the hub 6.

Because the HDD 40 in this embodiment is constituted as above, the disk 13 fixed to the outer peripheral part of the hub 6 can be rotated, with the shaft 1 serving as the rotational axis on the fixed side, by imparting rotational drive force to the magnet 7 while applying voltage to the stator coil 9 wound around the stator core 8.

[Relation Between the Stator Core 8 and the Magnet 7]

Figure 16:
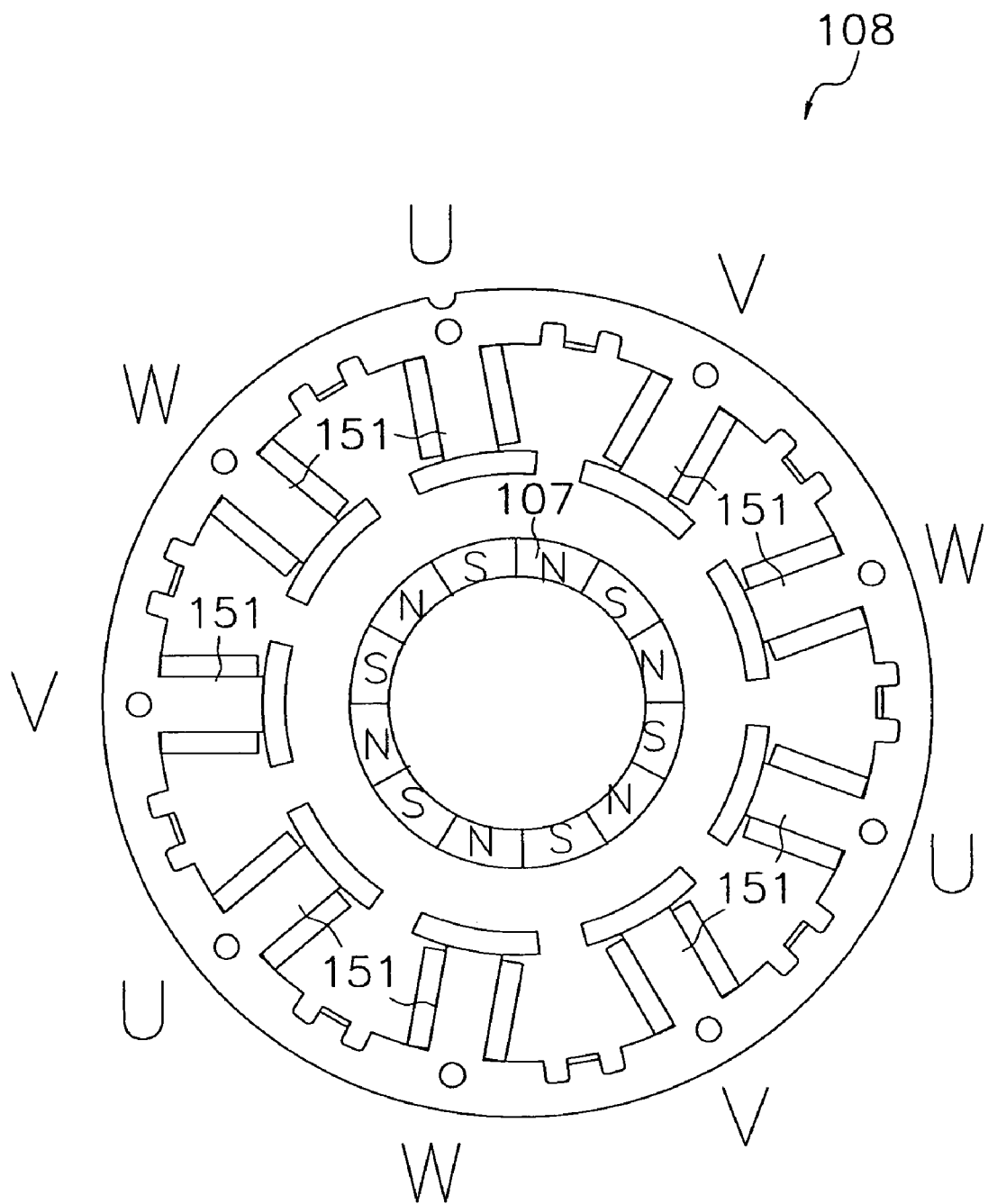
FIG. 16 is a plan view of the structure of a stator core mounted in a conventional spindle motor.

First, the relationship between the magnet and the stator core included in a typical spindle motor will be described through reference to FIG. 16, which illustrates the structure of a conventional spindle motor.

This spindle motor is such that the magnet 107 is magnetized to 12 poles with respect to the stator core 108. The stator core has 9 salient pole components, and the pole pitch is 40° (=360°/9).

The conventional spindle motor described here has a three-phase motor winding, and three salient pole components 151 make up a set and constitute the U, V, and W phases.

The magnet 107 corresponding to a set of salient pole components 151 consists of four poles. Therefore, when the magnet 107 makes one rotation, an alternating magnetic field of 6 periods is generated.

Meanwhile, as shown in FIG. 6, the spindle motor 20 pertaining to the above embodiment is an inner rotor type in which the stator core 8 is disposed at the outer peripheral part of the magnet 7. The following description applies equally to an outer rotor type in which the magnet is disposed around the outer periphery of the stator core.

As shown in FIG. 6, the spindle motor 20 is such that the magnet 7 is magnetized to 14 poles. There are 9 of the salient pole components 51 of the stator core 8, and the pole pitch is approximately 34° (=360°/10.5).

The spindle motor 20 of this embodiment also has a three-phase motor winding, and three salient pole components 151 make up a set and constitute the U, V, and W phases.

Here, the magnet 7 corresponding to the 9 salient pole components 51 has 12 of the 14 magnetic poles. Thus, the magnet 7 corresponding to the above-mentioned set of salient pole components 51 consists of four poles. Therefore, in the case of the spindle motor 20 of this embodiment, when the magnet 7 makes one rotation, an alternating magnetic file of 7 periods is generated.

WORKING EXAMPLES

The setting of the compensating pole plate angle θ (see FIGS. 4 and 5) of the cut-outs 53 to 55 formed in the stator core 8 included in the spindle motor 20 described for the above embodiment will now be described.

Simplistically, just one of the three sets of U, V, and W could be cut out in order to create a space in part of the stator core so that the recording and reproduction heads will be able to move. In other words, in this case the cut-out angle is set to 120°.

If this is done, however, the space formed in the stator core will be too large with respect to the space needed for the movement of the recording and reproduction heads.

Consequently, if we consider a case in which the cut-out angle is set to 60° (one-half of 120°), we will need 18 of the salient pole components 51 and 24 magnetization poles for the magnet. Calculation reveals that this structure does not afford enough space for winding, and inadequate winding translates to insufficient motor torque.

In view of this, to solve this problem, the magnetization number is increased by two poles as discussed above (to 14 poles), and this two poles' worth of space is used for the movement of the recording and reproduction heads. The portion contributing to the generation of torque remains the same as in the conventional structure, with 12 magnetic poles and 9 salient pole components. Put another way, two of the 14 poles provided to the magnet do not contribute to the generation of torque in the spindle motor 20. Therefore, torque fluctuation in the spindle motor 20 can be suppressed by adjusting the magnetic flux by means of the compensating pole plate 11 so that these extra two poles have no adverse effect.

This ensures an empty space of approximately 51°, and also minimizes the decrease in motor torque caused by a reduction in winding space.

As to the compensating pole plate angle of the cut-outs 53 to 55, with the spindle motor 20 having a basic structure comprising 4 magnetic poles and 3 salient pole components, the angle can be set according to the following relational formula (1).

$$\theta = 360/Nm \times 2 \quad (1)$$

Where the magnetization number Nm of the magnet 7=(4+2n) (n=1, 3, 5, . . . ), the salient pole number Np=(Nm−2)×¾, and the salient pole pitch θ1=(360−θ)/Np.

In the case of the above working example, for instance, since the magnetization number of the magnet 7 is 14, if we plug n=5 into Relational Formula 1, we obtain the following.

$$\theta = 360 \times 2/14$$
$$= 51.43$$
$$\approx 51(°)$$

Here, the number Np of salient pole components=(14−2)×¾=9 (poles), and the pitch θ1 of the salient pole components=(360−51)/9=34.33 (°).

Thus, when the magnet 7 has an even number of poles of 4 or more, setting the compensating pole plate angle θ according to Relational Formula 1 ensures adequate space for the movement of the plurality of recording and reproduction heads 12a and 12b mounted in the HDD 40, while allowing the space of the cut-outs 53 to 55 to be an appropriate size that is not too large.

Next, the effect obtained by providing the compensating pole plate to the space of the cut-outs whose cut-out angle has been set as above will be described.

Figure 9:
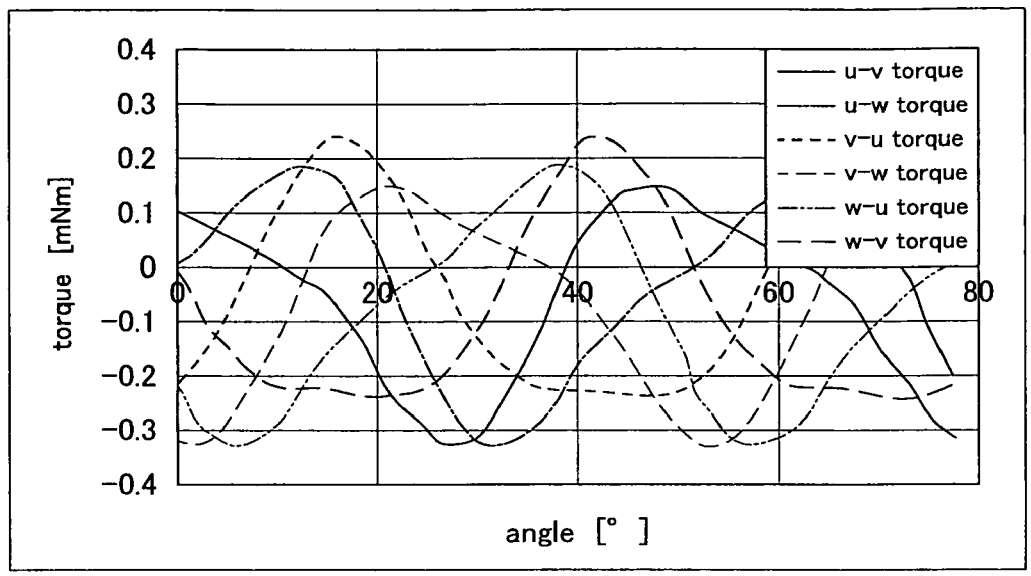
FIG. 9 is a graph of the experiment results in a working example pertaining to the present invention.

FIG. 9 shows a simulation of the torque fluctuation when the cut-out 55 is formed as shown in FIG. 6, and no compensating pole plate 11 is provided.

It can be seen from the results shown in FIG. 9 that torque fluctuation (corresponds to fluctuation in the envelope curve in FIG. 9) reaches its maximum at about 0.2 mNm.

Figure 10:
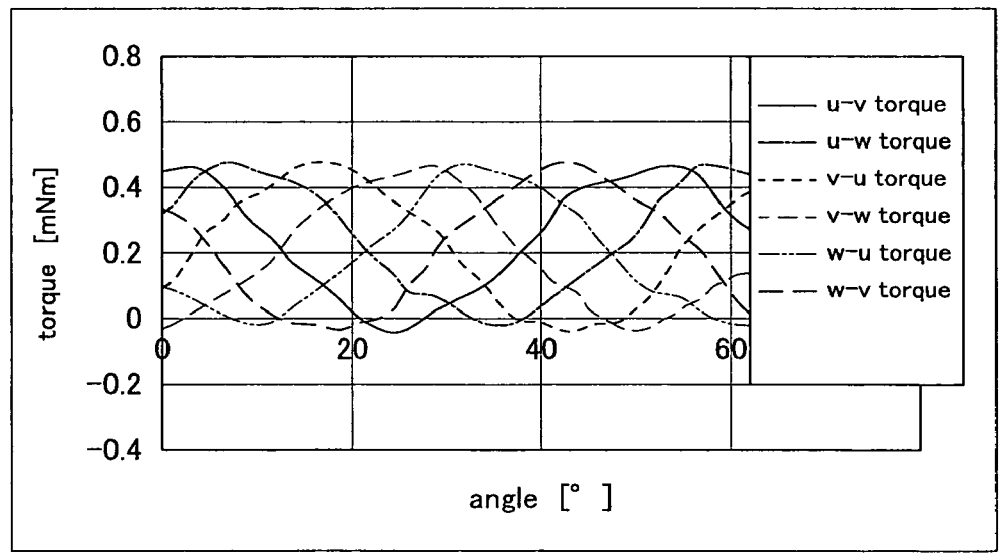
FIG. 10 is a graph of the experiment results in a comparative example contrasted with a working example pertaining to the present invention.

In contrast, FIG. 10 shows the results of a simulation of the torque fluctuation when the cut-out 55 is formed as shown in FIG. 6, the salient pole components 51 are disposed coaxially along the ends on the inner peripheral side of the salient pole components 51, the cut-out angle of the stator core 8 is set to 66°, and the angle of the compensating pole plate is set to 51°.

It can be seen from the results shown in FIG. 10 that torque fluctuation reaches its maximum at about 0.05 mNm, which is about one-fourth the result shown in FIG. 9.

Figure 11:
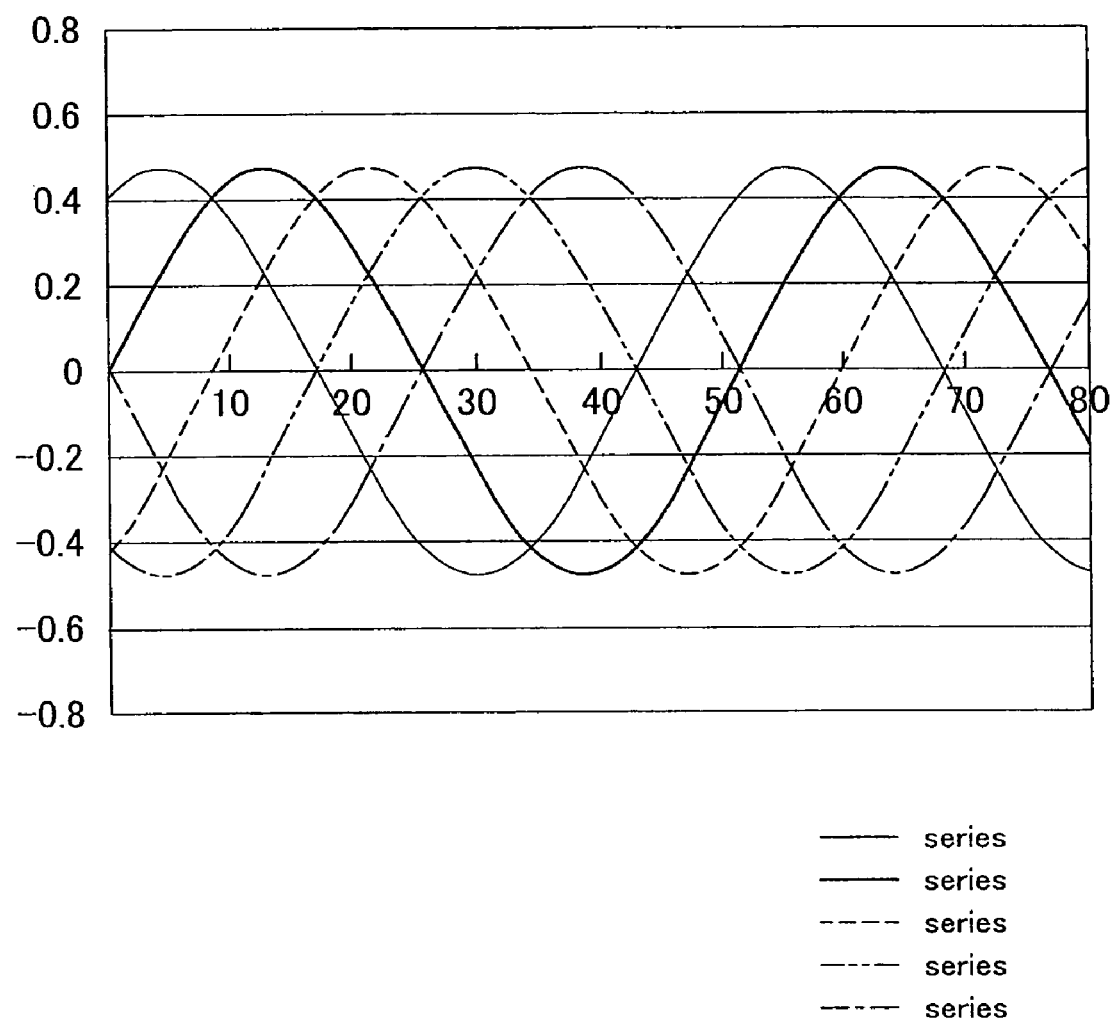
FIG. 11 is a graph of the torque fluctuation waveform generated by sine wave torque.

It can also be seen from the results shown in FIG. 10 that while the torque fluctuation waveform is distorted and the high-frequency component increases, the fluctuation value is not that different from when the ideal sine wave torque is generated (FIG. 11).

With a structure in which the compensating pole plate 11 is not provided in the cut-out portion of the stator core 8 (the cut-out 55), the magnetic flux distribution between the magnet 7 and the stator core 8 ends up being more distorted than in other portions. (In the example shown in FIG. 6, the W phase and V phase at the ends of the cut-out are affected the most.)

In other words, providing the compensating pole plate 11 in the space of the cut-out 55 reduces the distortion (imbalance) of the magnetic flux distribution and results in less torque fluctuation.

The results here will vary with the thickness, material, and shape of the compensating pole plate 11 provided in the cut-out 55.

The angle of the compensating pole plate 11 here was also examined, the results of which will now be described through reference to FIG. 17.

Here, the thickness of the compensating pole plate 11 is assumed to be 0.5 mm, and the maximum and minimum values for torque (as discussed regarding FIGS. 9 to 11) were examined while the compensating pole (plate) angle was varied. The difference between the maximum and minimum values here is what is referred to as the torque fluctuation.

Figure 17:
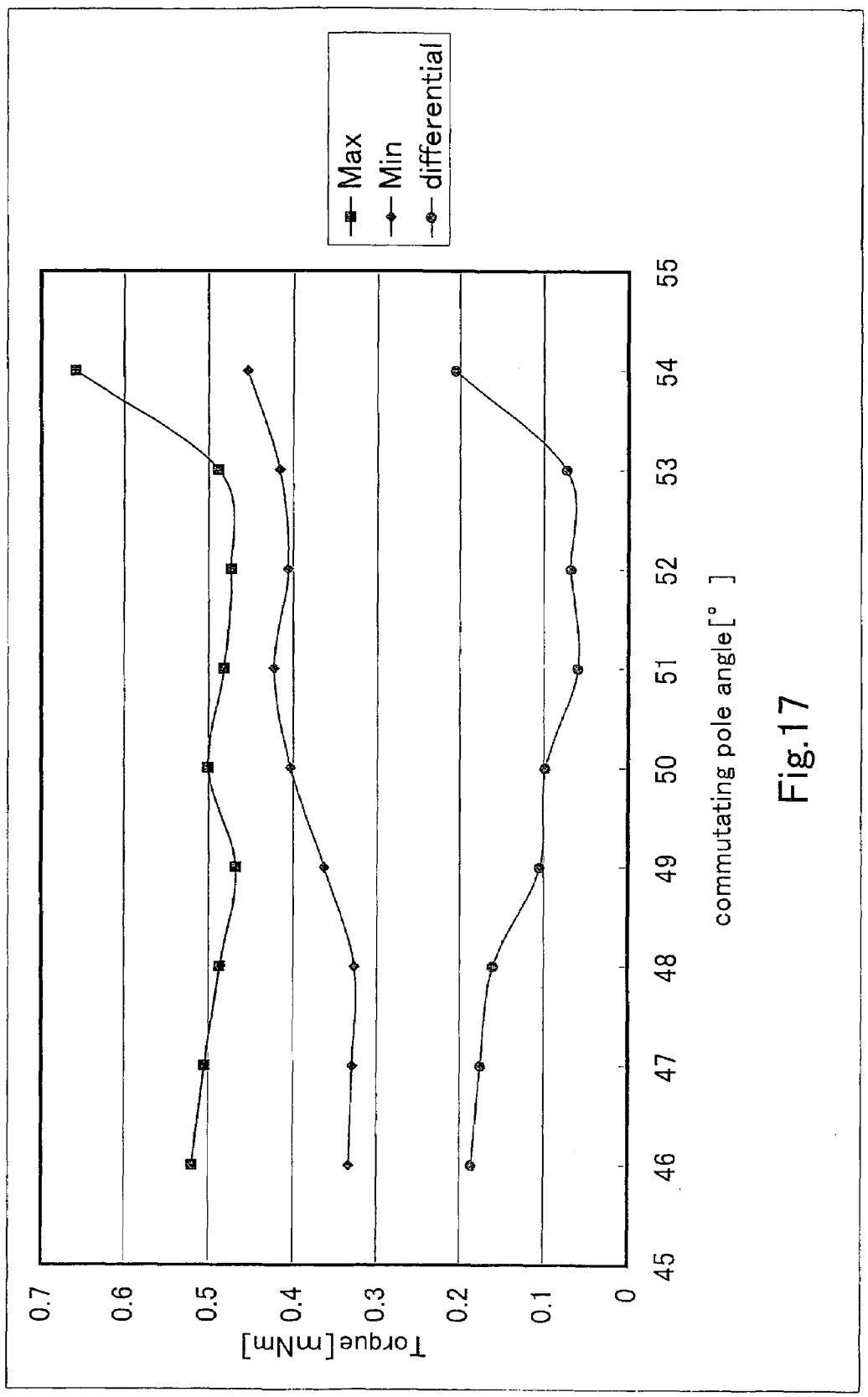
FIG. 17 is a graph of the relation between torque fluctuation and the compensating pole plate angle pertaining to a working example of the present invention.

As shown in FIG. 17, it can be seen that the torque fluctuation was at its minimum in the vicinity of 51 degrees, and that for practical purposes, 49 to 53 degrees is preferable because torque fluctuation will be lower.

Care must be taken, however, because if the angle of the compensating pole plate is too large, the work will become much more difficult in winding the stator coil around the stator core to which the compensating pole plate is attached.

[Features of the Present Spindle Motor 20]

(1)

As shown in FIG. 6, with the spindle motor 20 of this embodiment, the stator core 8 comprises the plurality of salient pole components 51 that are formed in a radial shape, are wound with the stator coil 9 and are disposed at a uniform angle except for a non-equiangular pitch portion, the circular outer peripheral yoke 52 formed so as to be continuous with the outer peripheral side of the salient pole components 51, the cut-out 55 which is formed by cutting out part of the outer peripheral yoke 52 in an approximate sector-shape except in the non-equiangular pitch portion of the salient pole components 51, and the compensating pole plate 11 which is provided in the cut-out 55 (the non-equiangular pitch portion) along the ends on the inner peripheral side of the non-equiangular pitch portion where the salient pole components 51 are formed.

This allows the torque fluctuation of the spindle motor 20 to be kept to a minimum by using the compensating pole plate 11 provided to the cut-out 55 (non-equiangular pitch portion) to compensate for the imbalance in the magnetic flux produced by forming the cut-out 55 in the outer peripheral yoke 52.

Also, enough room for movement of the recording and reproduction heads 12*a* and 12*b* mounted to the HDD 40 can be ensured by disposing the compensating pole plate 11 at a location corresponding to the ends on the inner peripheral side of the plurality of salient pole components 51 in the cut-out 55.

In particular, with the spindle motor 20 in this embodiment, the salient pole components 51 are not formed in the portion of the cut-out 55 that serves as the space in which the recording and reproduction heads 12*a* and 12*b* move. Accordingly, plenty of space can be ensured for movement of the heads in the thickness direction. As a result, even when a HDD is mounted with a plurality of recording and reproduction heads, since the size in the thickness direction can be about the same as that of a single-head HDD (such as a thickness of 3.3 mm), the apparatus can be thinner than a conventional HDD mounted with a plurality of heads.

(2)

The spindle motor 20 of this embodiment is provided with the base 5 on which the stator core 8 is placed, and the compensating pole plate 11, which is substantially L-shaped, is fixed over this base 5.

As a result, even when the base 5 is formed from an aluminum-based non-magnetic material, the compensating pole plate 11 can be formed from a magnetic material and fixed to the base 5.

Also, when the compensating pole plate 11 is formed separately from the salient pole components 51, because the gap between the compensating pole plate 11 and adjacent salient pole components 51 is small during the winding of the stator coil 9 onto the salient pole components 51, the compensating pole plate 11 will not get in the way and impair work efficiency. The result is that work is facilitated during the winding of the stator coil 9 onto the salient pole components 51, and the spindle motor 20 can be manufactured more efficiently.

(3)

With the spindle motor 20 of this embodiment, the stator core 8 is produced by laminating three layers in the following order: the compensating pole plate sheet 21 that includes the compensating pole plate 11, the salient pole component cut-out sheet 22 from which part of the salient pole components 51 are cut out, and the substantially C-shaped salient pole component and outer peripheral yoke cut-out sheet 23 from which parts of both the salient pole components 51 and the outer peripheral yoke 52 have been cut out.

Consequently, after the compensating pole plate 11 is formed separately from the salient pole components 51, and the stator coil 9 is wound around the salient pole components 51, the compensating pole plate sheet 21 and the other two sheets 22 and 23 are laminated, so that even when the salient pole components 51 and the compensating pole plate 11 are adjacent, the compensating pole plate 11 does not adversely affect the winding of the stator coil 9. As a result, the work involved in producing the spindle motor 20 is easier.

Also, when the salient pole component cut-out sheet 22 with the outer peripheral yoke 52 still in circular form is interposed in the middle of the three sheets 21 to 23, this prevents a decrease in the stiffness of the stator core 8 that would otherwise be caused by the formation of the cut-outs 53 to 55, and avoids the problem of distortion occurring in the stator core 8 during the winding of the stator coil 9 around the salient pole components 51.

(4)

As shown in FIGS. 2 and 6, with the spindle motor 20 of this embodiment, the compensating pole plate 11 is formed so as to be arc-shaped in plan view.

Consequently, since the compensating pole plate 11 can be disposed along the positions corresponding to the ends on the inner peripheral side of the adjacent salient pole components 51, the distance from the facing magnet 7 is uniform, so any imbalance in the magnetic flux caused by the formation of the cut-outs 53 to 55 can be effectively compensated for by the arc-shaped compensating pole plate 11.

(5)

With the spindle motor 20 of this embodiment, the stator core 8, which has a basic structure of 4 magnetic poles and 3 poles, has cut-outs 53 to 55 with a compensating pole plate angle θ set according to the following relational formula (1):

$$\theta = 360/Nm \times 2 \qquad (1)$$

where the magnetization number Nm of the magnet=4+2n (n=1, 3, 5, ...), the salient pole number Np of the stator=(Nm−2)×¾, and the stator salient pole pitch θ1=(360−θ)/Np.

Consequently, a cut-out angle of approximately 51° can be set in the case of the above embodiment by setting the compensating pole plate angle θ according to Relational Formula 1 above. As a result, with a spindle motor 20 having a magnet 7 with a magnetization number of 6 poles or higher, plenty of room for the movement of the plurality of recording and reproduction heads 12a and 12b mounted on the HDD 40 can be ensured, while the optimal angle can be set for the cut-outs 53 to 55 that will not be too large a space.

OTHER EMBODIMENTS

An embodiment of the present invention was described above, but the present invention is not limited to the above embodiment, and various modifications are possible without deviating from the gist of the present invention.

(A)

In the above embodiment, an example was given in which, in the cut-outs 53 to 55, all of the outer peripheral yoke 52 was cut out in the rotational axis direction (thickness direction). The present invention is not limited to this, however.

For instance, the outer peripheral yoke 52 may be cut out only partially in the rotational axis direction.

Nevertheless, cutting out all of the outer peripheral yoke in the rotational axis direction is preferable in terms of ensuring enough space for the recording and reproduction heads to move, and particularly in the rotational axis direction.

(B)

In the above embodiment, an example was given in which the stator core 8 was produced by laminating three layers including the compensating pole plate 11, the salient pole components 51, and the outer peripheral yoke 52. The present invention is not limited to this, however.

Figure 12:
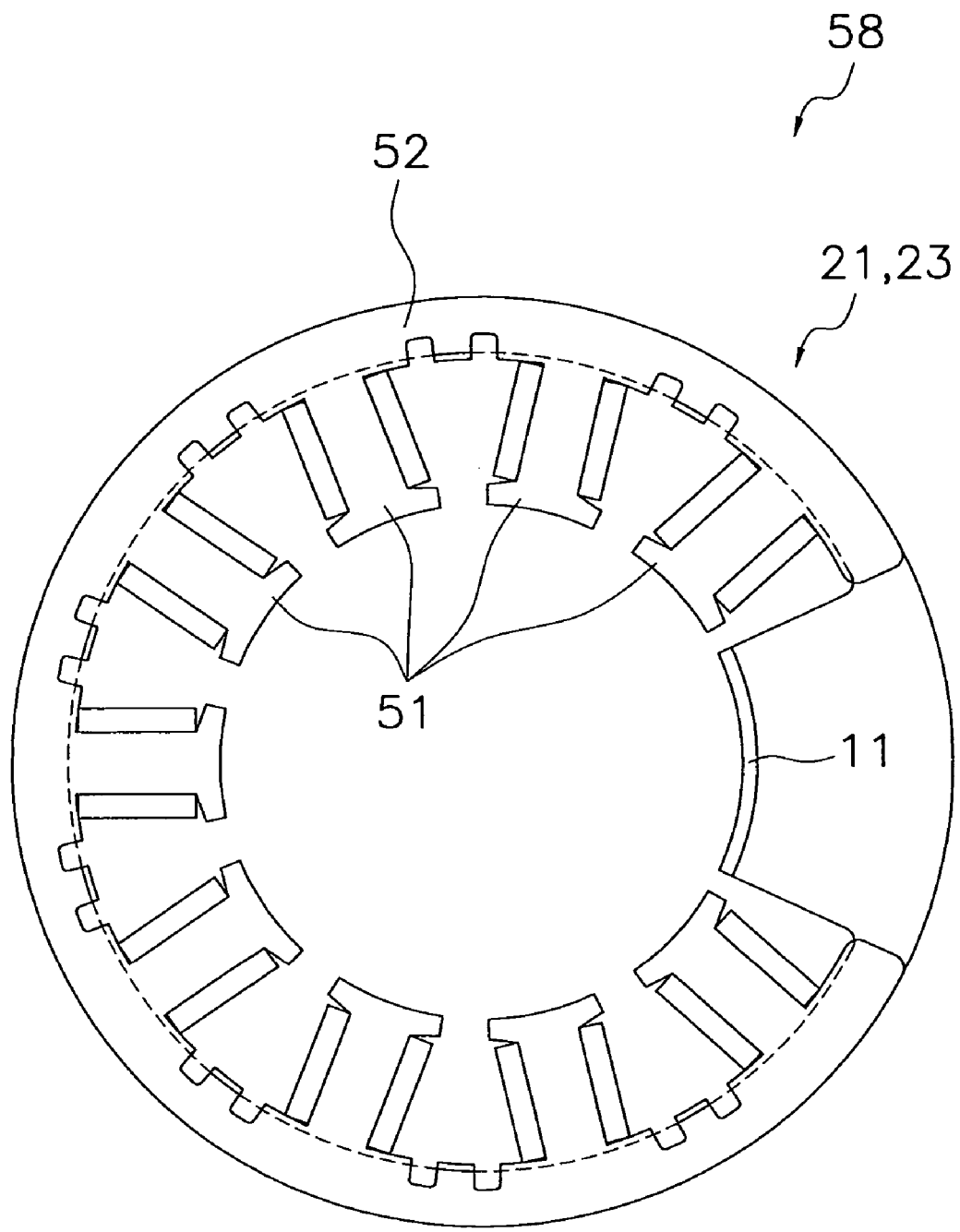
FIG. 12 is a plan view of the structure of the stator core included in the spindle motor pertaining to another embodiment of the present invention.

For instance, as shown in FIG. 12, a stator core 58 may be made up of just two layers (the compensating pole plate sheet 21 and the salient pole component and outer peripheral yoke cut-out sheet 23), eliminating the second layer disposed in the middle of the three layers.

With this stator core 58, a plurality of the salient pole component and outer peripheral yoke cut-out sheets 23 are formed by being punched out in the proper shape, after which these sheets are concentrically laminated. This laminate (salient pole component and outer peripheral yoke cut-out sheets 23) is given an insulating coating (powder coating, spray coating, or electrodeposition coating), and the stator coil is then wound. If the number of salient pole component and outer peripheral yoke cut-out sheets 23 laminated is large, deformation of the stator core 58 can be kept relatively small even if it is chucked during this winding. The stator core 58 is formed by fixing (adhesive bonding or the like) the compensating pole plate sheet to this wound stator core.

Here again, even when a plurality of recording and reproduction heads are mounted to the HDD, a spindle motor that is thinner and more compact can be provided, which is the same effect as that discussed above.

Nevertheless, disposing a layer whose outer periphery is linked in a circular shape as the second layer laminated in the middle of the three layers is preferable in terms of keeping to a minimum the distortion that occurs in the stator core during the winding of the stator coil onto the salient pole components where the cut-out is formed, even when the number of laminations of the salient pole component and outer peripheral yoke cut-out is small.

Furthermore, again with this embodiment the slot gap between the compensating pole plate and the adjacent salient pole components is smaller than the slot spacing between adjacent salient pole components, but when the operating path of the winding nozzle and the winding speed are taken into account, the winding of the salient pole components adjacent to the compensating pole plate may be performed after the compensating pole plate sheet and the salient pole component and outer peripheral yoke cut-out sheet have been laminated so as to be concentric.

(C)

In the above embodiment, an example of the stator core 8 was given in which the compensating pole plate 11 was formed from a different material in a separate layer compensating pole plate sheet 21) from the salient pole components 51 and the outer peripheral yoke 52. The present invention is not limited to this, however.

Figure 13:
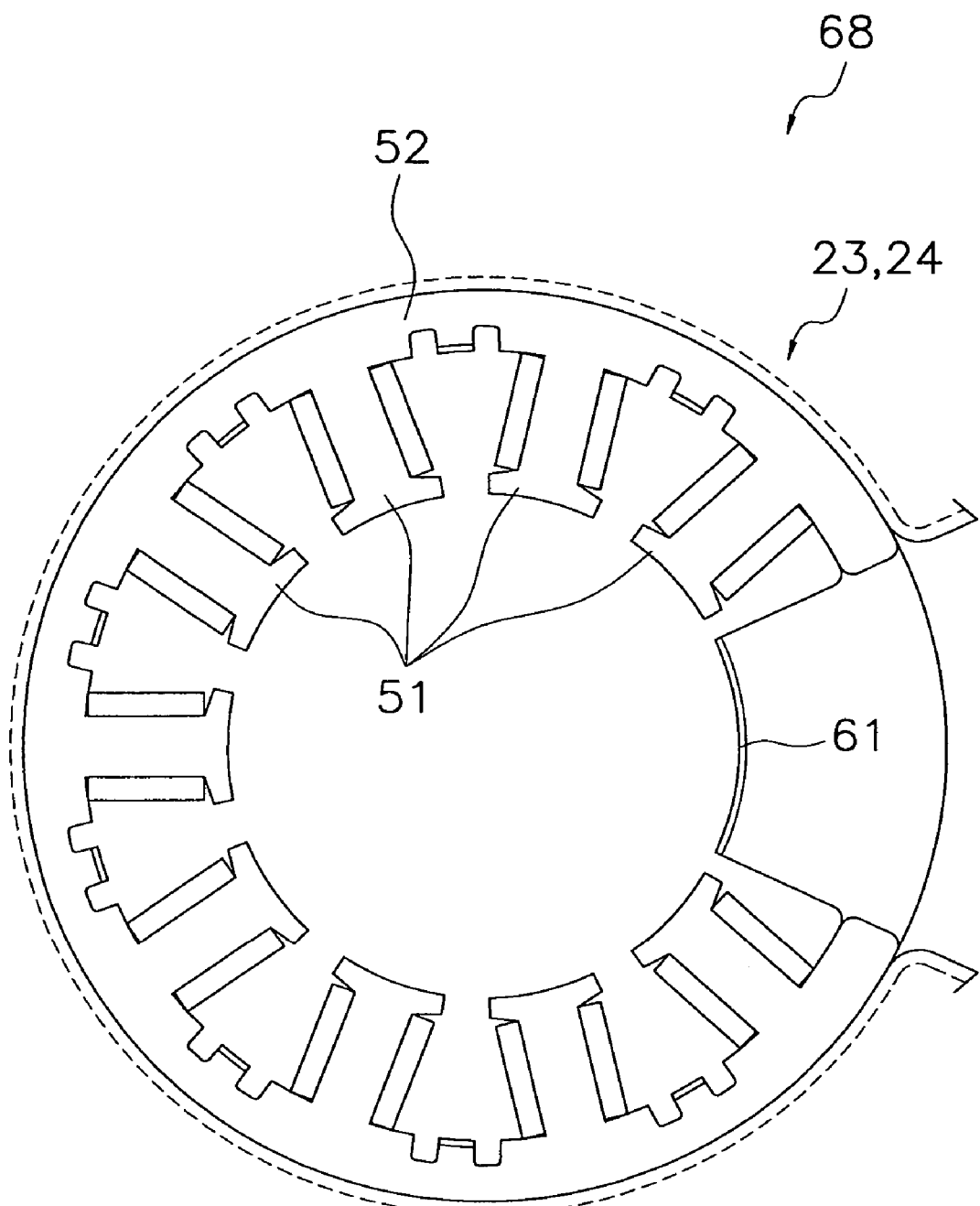
FIG. 13 is plan view of the structure of the stator core included in the spindle motor pertaining to yet another embodiment of the present invention.

For instance, as shown in FIG. 13, a stator core 68 may be employed in which a compensating pole plate 61 is formed within a compensating pole plate sheet 24 including salient pole components and the outer peripheral yoke 52, and laminated along with the salient pole component and outer peripheral yoke cut-out sheet 23.

In this case, since the compensating pole plate can be formed from the same material as that of the salient pole components and the outer peripheral yoke, cost is reduced compared to when the components are formed separately.

Again with the stator core 68 of this embodiment, the slot gap between the compensating pole plate and the adjacent salient pole components is smaller than the slot spacing between adjacent salient pole components, but when the operating path of the winding nozzle and the winding speed are taken into account, the winding of the salient pole components adjacent to the compensating pole plate may be performed after the compensating pole plate sheet and the salient pole component and outer peripheral yoke cut-out sheet have been laminated so as to be concentric.

(D)

In the above embodiment, an example of the stator core 8 was given in which the compensating pole plate 11 was formed from a different material in a separate layer compensating pole plate sheet 21) from the salient pole components 51 and the outer peripheral yoke 52. The present invention is not limited to this, however.

Figure 14A:
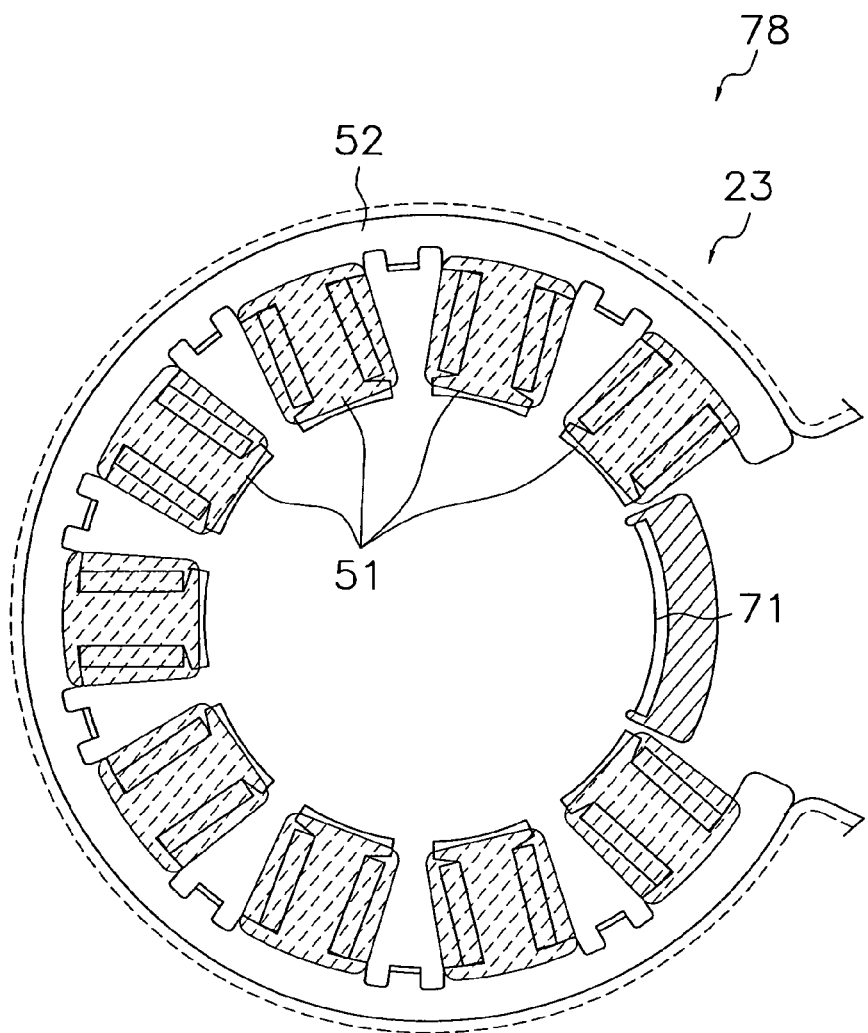
FIGS. 14a and 14b are plan views of the structure of the stator core included in the spindle motor pertaining to yet another embodiment of the present invention.
Figure 14B:
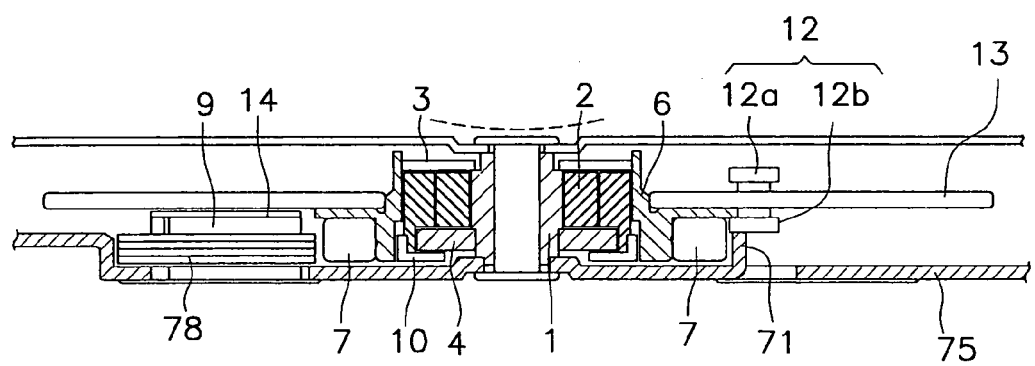

For instance, as shown in FIGS. 14a and 14b, a stator core 78 may be employed in which a compensating pole plate 71 is formed so as to cut open part of a base 75.

In this case, the salient pole component and outer peripheral yoke cut-out sheet 23 is laminated over the base 75. Alternatively, the salient pole component cut-out sheet 22 and the salient pole component and outer peripheral yoke cut-out sheet 23 may be laminated over the base 75.

Here, the compensating pole plate 71 is produced by bending the base 75. In the base 75, the compensating pole plate 71 rises up as a concentric circle along the ends on the inner peripheral side of the salient pole components. The salient pole component and outer peripheral yoke cut-out sheet 23 is laminated as the uppermost layer in the lamination state shown in FIG. 14a, and part of the salient pole components 51 is cut out on the inner peripheral side, and part of the circular shape on the outer peripheral side, forming an approximate C-shape.

With this stator core 78, a plurality of the salient pole component and outer peripheral yoke cut-out sheets 23 are punched out in the appropriate size and are laminated so that all of the sheets are aligned concentrically. Next, this laminate is given an insulating coating (powder coating, spray coating, or electrodeposition coating).

With the above structure, production costs can be reduced because the compensating pole plate 11 can be formed integrally with the base 5.

(E)

In the above embodiment, an example of the stator core 8 was given in which the compensating pole plate 11 was formed from a different material in a separate layer (the compensating pole plate sheet 21) from the salient pole components 51 and the outer peripheral yoke 52. The present invention is not limited to this, however.

Figure 15A:
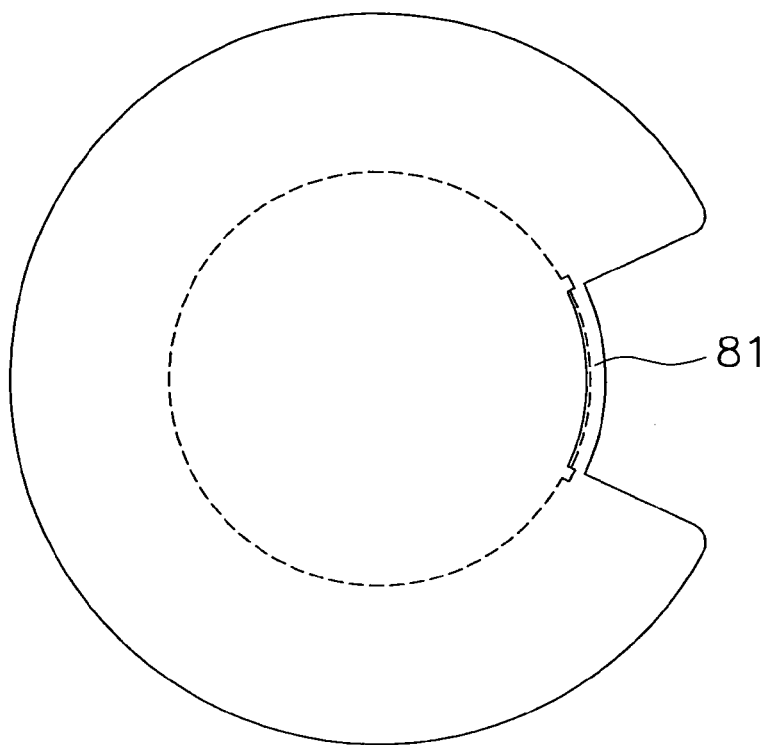
FIGS. 15a and 15b are plan views of the structure of the stator core included in the spindle motor pertaining to yet another embodiment of the present invention.
Figure 15B:
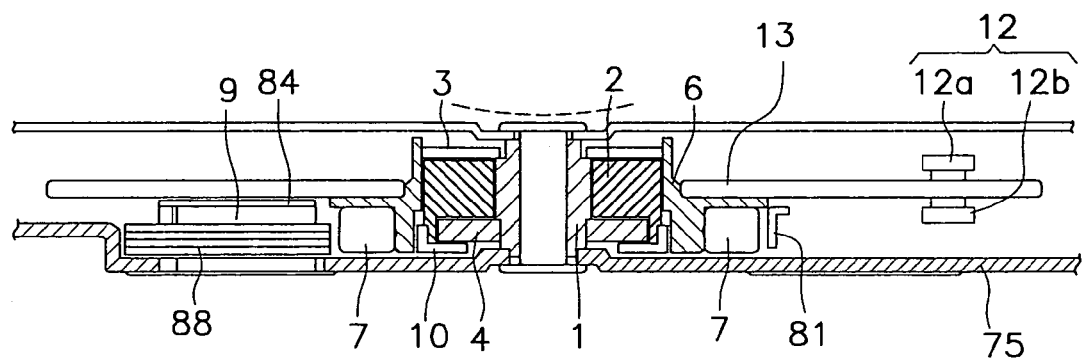

For instance, as shown in FIG. 15, a compensating pole plate 81 made be formed by cutting away part of a magnetic shield plate 84 attached so as to cover the upper part of the stator core (core). In this case, the cost is reduced compared to when the compensating pole plate is formed as a separate member from the magnetic shield plate.

(F)

In the above embodiment, an example of the stator core 8 was given in which the compensating pole plate 11 was formed from a different material in a separate layer (the compensating pole plate sheet 21) from the salient pole components 51 and the outer peripheral yoke 52. The present invention is not limited to this, however.

Figure 18:
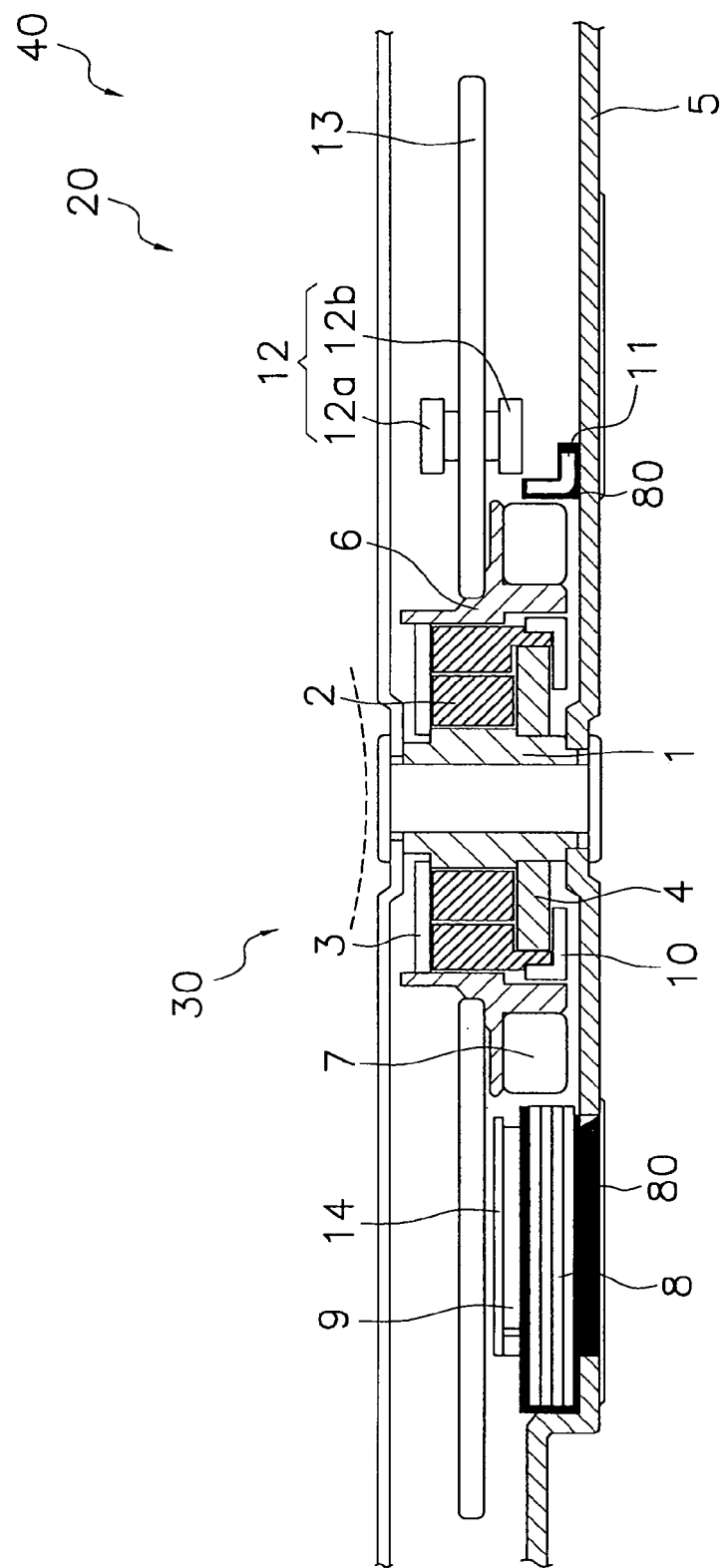
FIG. 18 is a cross-sectional view of the structure of a molded motor type of spindle motor pertaining to yet another embodiment of the present invention.

For instance, the compensating pole plate may be formed and disposed independently from the other magnetic bodies included in the spindle motor. In this case, as shown in FIG. 18, for example, a molded motor structure can be employed in which the stator core 8 portion is molded with a resin 80, which allows it to be independent from other magnetic bodies. In this case, the magnetic body included in the compensating pole plate can function without affecting the motor magnetic circuit (not shown) included in the spindle motor.

(G)

In the above embodiment, an example was given in which the cut-out angle of the cut-outs 53 to 55 was set according to Relational Formula 1 above for the stator core 8 having a basic structure comprising 4 magnetic poles and 3 salient pole components. The present invention is not limited to this, however.

For instance, with a stator core having a basic structure comprising 2 magnetic poles and 3 salient pole components, the cut-out angle of the cut-outs can also be set according to Relational Formula 2 below.

$$\theta = 360/Nm \times 2 \quad (2)$$

Where the magnetization number Nm of the magnet=$4+2n$ ($n=0, 1, 2, 3, \ldots$), the salient pole number Np of the stator=$(Nm-2) \times 3/2$, and the stator salient pole pitch $\theta 1 = (360-\theta)/Np$.

Here again, by setting the compensating pole plate angle $\theta$ according to Relational Formula 2 above, with a spindle motor 20 having a magnet 7 with an even magnetization number of 4 poles or higher, plenty of room for the movement of the plurality of recording and reproduction heads 12a and 12b mounted on the HDD 40 can be ensured, while the optimal angle can be set for the cut-outs 53 to 55 that will not be too large a space, according to the magnetization number of the magnet 7.

(H)

In the above embodiment, an example was given in which the compensating pole plate 11 was formed at an angle (cut-out angle) around the shaft 1 of 51°. The present invention is not limited to this, however.

When the angle is set to 51°, the slop spacing on both sides of the compensating pole plate 11 is narrower, and this makes it more difficult to wind the stator coil 9 so to strike a good balance between torque fluctuation and facilitating work during winding, the angle may be varied between 49 and 53°.

In this case, the slot width will be from 0.98 to 1.02 mm in places other than a cut-out, whereas the slot width on both sides of the compensating pole plate in the cut-out will be from 0.58 to 0.42 mm.

(I)

In the above embodiment, an example of the spindle motor 20 was given in which the magnet 7 was magnetized to 14 poles, and there were nine of the salient pole components 51 in the stator core 8. The present invention is not limited to this, however.

For instance, as long as the magnetization number of the magnet is an even number of at least six, the number is not limited to 14 poles.

(J)

In the above embodiment, an example was given in which the compensating pole plate sheet 21 was laminated after the stator coil 9 had been wound. The present invention is not limited to this, however.

For instance, the when the operating path of the winding nozzle and the winding speed are taken into account, the winding of the salient pole components adjacent to the compensating pole plate may be performed after the three sheets have been laminated concentrically.

However, in terms of not making the winding work any more difficult even when the gap between the salient pole components 51 adjacent to the compensating pole plate 11 (slot gap) is smaller than the spacing between the salient pole components 51 (slot spacing), it is preferable to employ the assembly procedure outlined in the above embodiment.

(K)

In the above embodiment, an example was given in which the cross section illustrating the cut-out portion was in a state in which the stator core and the windings had been laid bare. The present invention is not limited to this, however.

Usually, the top surface of a stator core or coil is covered with a magnetic shield plate in an effort to keep the electromagnetism generated from the spindle motor portion from affecting the heads or disks, but it was found that this also has to be taken into account with a spindle motor having cut-outs as in the present invention.

Figure 19A:
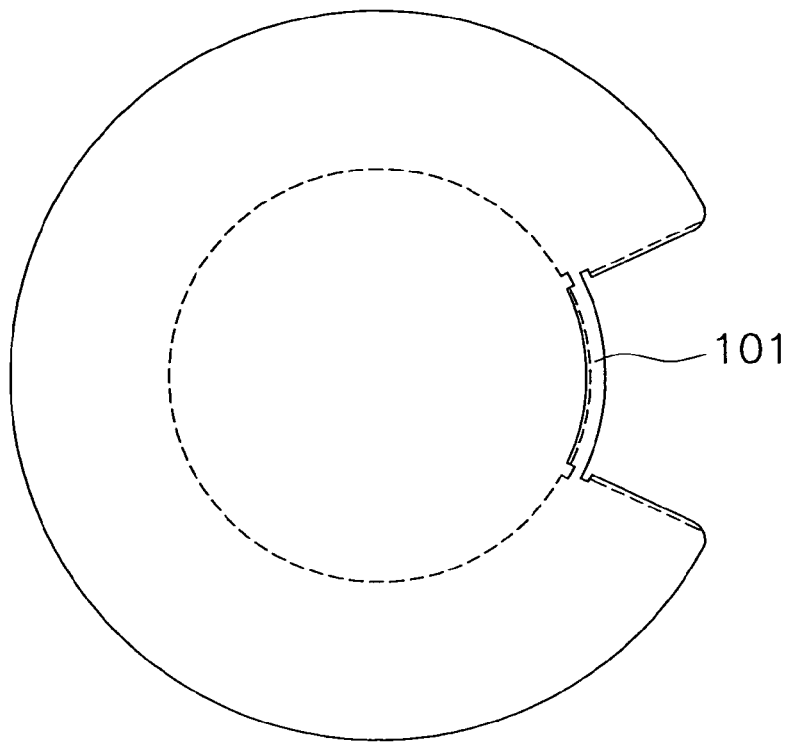
FIG. 19 is a cross-sectional view of the structure of the spindle motor pertaining to yet another embodiment of the present invention.
Figure 19B:
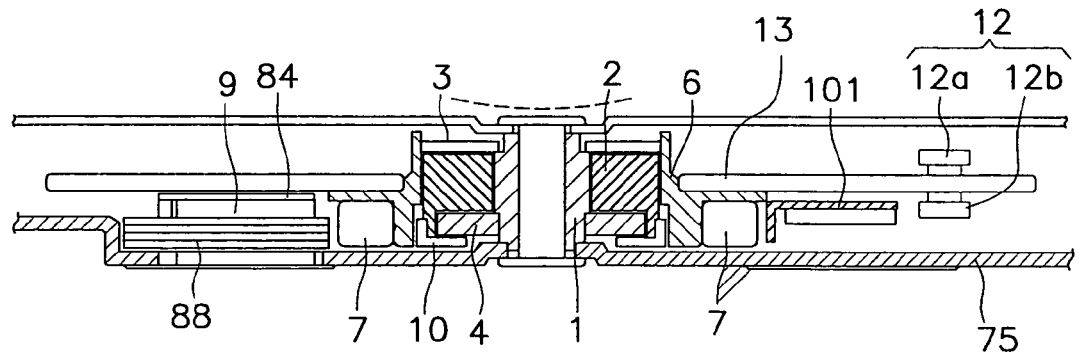

Accordingly, as shown in FIG. 19, it is preferable if a magnetic shield component 101 is provided to a region corresponding to the cut-outs and to a compensating pole plate featuring the magnetic shield plate 84 shown in FIG. 15.

This keeps electromagnetism from the cut-outs from affecting the heads, disks, etc.

The compensating pole plate and the magnetic shield portion (the normal shield portion and the cut-out shield portion) may also be separated from each other.

(L)

In the above embodiment, an example was given in which the present invention was applied to an inner rotor type of spindle motor 20 in which the stator core 8 was disposed on the outer peripheral part of the magnet 7. The present invention is not limited to this, however.

For instance, the present invention may also be applied to an outer rotor type of spindle motor in which the magnet is disposed around the outer periphery of the stator core.

The effect in this case will be the same as that described above.

(M)

In the above embodiment, an example was given in which the present invention was applied to a spindle motor 20 with a fixed shaft. The present invention is not limited to this, however.

For instance, it can, of course, also be applied to a spindle motor with a rotating shaft. Here again, just as in the above, the effect is that the apparatus can be made thinner and more compact even when a plurality of heads are mounted.

(N)

In the above embodiment, an example was given in which the present invention was applied to a HDD mounted with a disk 13 having a diameter of 0.85 inch. The present invention is not limited to this, however.

For instance, the present invention can, of course, also be applied to a HDD mounted with a disk of another size, such as a disk with a diameter of 1.0 inch or of 1.8 inch.

(O)

In the above embodiment, an example was given in which the spindle motor 20 pertaining to an embodiment of the present invention was mounted in the HDD 40. The present invention is not limited to this, however.

For instance, in addition to a HDD, the apparatus in which [the spindle motor] is mounted can be an opto-magnetic disk device, an optical disk device, a floppy disk device, or the like. At the same time, the recording medium mounted in the apparatus is not limited to a hard disk (HD), and other optical recording media, or opto-magnetic recording media, magnetic recording media, or the like can also be used.

Regardless of which of these various recording media are used in the apparatus in which the spindle motor of the present invention is mounted, the same effect as above can be obtained, namely, making an apparatus equipped with a plurality of heads thinner and more compact.

Figure 20:
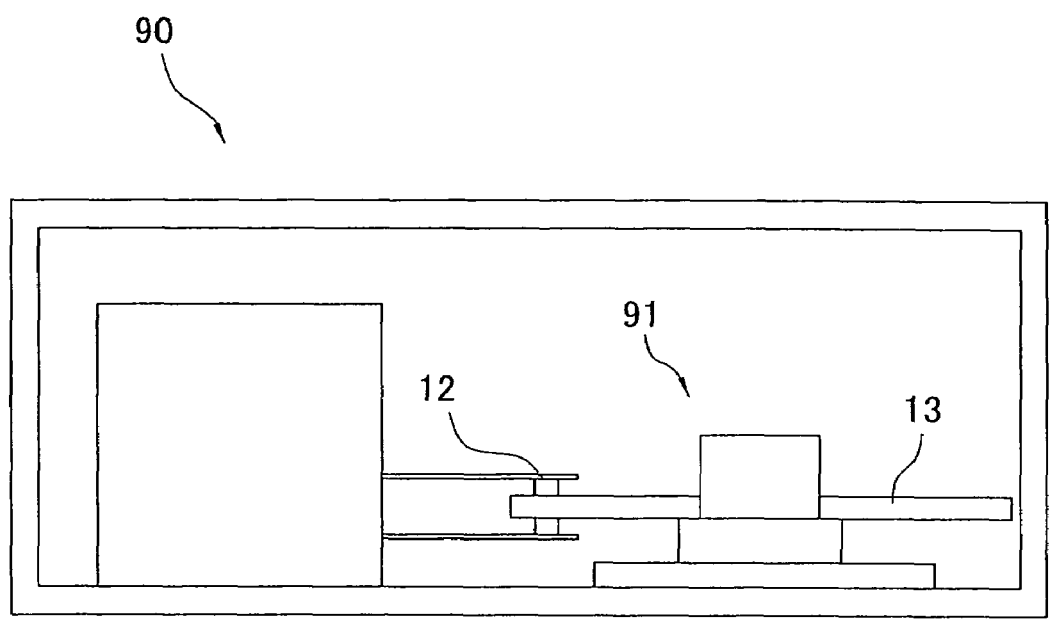
FIG. 20 is a cross-sectional view of a recording and reproducing apparatus equipped with the spindle motor of the present invention.

Also, as shown in FIG. 20, a recording and reproducing apparatus 90 equipped with a spindle motor 91 pertaining to the present invention will also afford an apparatus that is thinner, less expensive, and has larger capacity.

INDUSTRIAL APPLICABILITY

The effect of the spindle motor of the present invention is that an apparatus can be made thinner and more compact even when mounted in a HDD or the like in which a plurality of heads are mounted, and therefore the present invention can be widely applied to spindle motors mounted in various kinds of apparatus, such as HDDs, opto-magnetic disk devices, optical disk devices, floppy disk devices, and the like.

The invention claimed is:

1. A spindle motor, comprising:
   a shaft;
   a plurality of salient pole components around each of said salient pole components a stator coil is wound, and said plurality of salient pole components are disposed at an equiangular pitch, except for a non-equiangular pitch portion;
   a circular base is formed so as to be substantially continuous with respective ends of the plurality of salient pole components, and wherein said circular base having at least part of a portion that linking the salient pole components in the non-equiangular pitch portion is cut out in an axial direction or a peripheral direction having the shaft at a center thereof; and
   a compensating pole plate that is disposed along vicinity of the ends of the salient pole components in the non-equiangular pitch portion, and said compensating pole plate includes a magnetic body.

2. The spindle motor according to claim 1, wherein the compensating pole plate is formed so as to be continuous with respect to the circular base.

3. The spindle motor according to claim 1, further comprising a base component on which the salient pole components and the circular base are placed,
   wherein the compensating pole plate is formed so as to be continuous with respect to the base component.

4. The spindle motor according to claim 1, further comprising a base component on which the salient pole components and the circular base are placed,
   wherein the compensating pole plate is fixed with respect to the base component.

5. The spindle motor according to claim 1, further comprising a magnetic shield plate attached so as to cover the upper part of the salient pole components and the circular base,
   wherein the compensating pole plate is formed so as to be continuous with respect to the magnetic shield plate.

6. The spindle motor according to claim 1,
   wherein the compensating pole plate is formed independent from other magnetic materials.

7. The spindle motor according to claim 1, wherein the salient pole components, the circular base, and the compensating pole plate are formed by laminating:
   a first layer including the salient pole components and the circular base in which the cut-out is formed;
   a second layer including the circular base that continues in a substantially circular shape, and the salient pole components in part of which the cut-out has been formed; and
   a third layer including the circular base that continues in a substantially circular shape, and the compensating pole plate disposed so as to correspond to the position of the cut-out included in each of the first and second layers.

8. The spindle motor according to claim 1, wherein the salient pole components, the circular base, and the compensating pole plate are formed by laminating:
   a first layer including the salient pole components and the circular base in which the cut-out is formed; and
   a second layer including the circular base that continues in a substantially circular shape, and the compensating pole plate disposed so as to correspond to the position of the cut-out included in the first layer.

9. The spindle motor according to claims 1, wherein the compensating pole plate is formed in an arc shape whose center is the rotational axis in plan view.

10. The spindle motor according to claims 1, wherein the angle θ of the compensating pole plate that is disposed in the non-equiangular pitch portion and has the shaft as its center is set by the following relational formula (1):

$$\theta = 360/Nm \times 2 \qquad (1)$$

where the magnetization number Nm of the magnet=4+2n (n=1, 3, 5, ...),
the salient pole number Np of the stator=(Nm−2)×¾, and
the stator salient pole pitch θ1=(360−θ)/Np.

11. The spindle motor according to claim 10, said spindle motor including 14 magnetic poles and 9 salient pole components, wherein the angle θ of the compensating pole plate is set to between 49 and 53 degrees.

12. The spindle motor according to claims 1, wherein the angle θ of the compensating pole plate that is disposed in the non-equiangular pitch portion and has the shaft as its center is set by the following relational formula (2):

$$\theta = 360/Nm \times 2 \qquad (2)$$

where the magnetization number Nm of the magnet=4+2n (n=0, 1, 2, 3, . . . ),
the salient pole number Np of the stator=(Nm−2)×3/2, and
the stator salient pole pitch θ1=(360−θ)/Np.

13. The spindle motor according to claim 1, further comprising a magnetic shield plate attached so as to cover the upper part of the salient pole components and the circular base, wherein the magnetic shield plate is bent so as to cover part of the cut-out circular base, or the non-equiangular pitch portion that is part of the salient pole components.

14. The spindle motor according to claim 5, wherein the magnetic shield plate is bent so as to cover part of the cut-out circular base, or the non-equiangular pitch portion that is part of the salient pole components.

15. A recording and reproducing apparatus equipped with the spindle motor according to claims 1.

* * * * *